United States Patent
Rucci et al.

(10) Patent No.: US 9,355,571 B2
(45) Date of Patent: May 31, 2016

(54) MODULES AND METHODS FOR BIASING POWER TO A MULTI-ENGINE POWER PLANT SUITABLE FOR ONE ENGINE INOPERATIVE FLIGHT PROCEDURE TRAINING

(75) Inventors: John Rucci, East Longmeadow, MA (US); Anthony Z. Stobiecki, Huntington, CT (US); Brent Davis, Oxford, CT (US); Christopher James Myers, Guilford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1735 days.

(21) Appl. No.: 12/018,219

(22) Filed: Jan. 23, 2008

(65) Prior Publication Data

US 2009/0186320 A1  Jul. 23, 2009

(51) Int. Cl.
| | |
|---|---|
| G09B 9/16 | (2006.01) |
| G09B 9/08 | (2006.01) |
| G09B 9/18 | (2006.01) |
| G09B 9/46 | (2006.01) |
| B62D 1/22 | (2006.01) |
| G09B 9/20 | (2006.01) |
| A63H 27/00 | (2006.01) |
| B64C 27/04 | (2006.01) |
| G09B 9/44 | (2006.01) |
| B62D 1/02 | (2006.01) |

(52) U.S. Cl.
CPC .................. *G09B 9/46* (2013.01); *A63H 27/12* (2013.01); *B62D 1/22* (2013.01); *B64C 27/04* (2013.01); *G09B 9/08* (2013.01); *G09B 9/16* (2013.01); *G09B 9/165* (2013.01); *G09B 9/18* (2013.01); *G09B 9/203* (2013.01); *G09B 9/206* (2013.01); *G09B 9/44* (2013.01); *B62D 1/02* (2013.01)

(58) Field of Classification Search
CPC .............. G09B 9/08; G09B 9/16; G09B 9/18; G09B 9/46; G09B 9/165; G09B 9/203; G09B 9/206
USPC ........... 434/30, 32; 244/17.1, 17.9; 416/1, 25, 416/30, 31, 33, 34, 61
See application file for complete search history.

(56) References Cited

U.S. PATENT DOCUMENTS

| | | | |
|---|---|---|---|
| 3,963,372 A | | 6/1976 | McLain et al. |
| 4,271,664 A | * | 6/1981 | Earnest ...................... 60/39.181 |
| 4,434,956 A | * | 3/1984 | Gonzales ................... 244/17.25 |
| 4,488,851 A | | 12/1984 | Young |

(Continued)

FOREIGN PATENT DOCUMENTS

| | | | |
|---|---|---|---|
| CA | 2452212 | 6/2005 | |
| EP | 0095434 A2 | * 11/1983 | ................ F02C 9/26 |

OTHER PUBLICATIONS

International Search Report dated Sep. 25, 2009.

(Continued)

*Primary Examiner* — Nikolai A Gishnock
(74) *Attorney, Agent, or Firm* — Carlson, Gaskey & Olds, P.C.

(57) ABSTRACT

A system and method for conducting flight procedures training in a rotary-wing aircraft with a multi-engine powerplant includes determining a variable bias relative an available power margin to simulate a reduced power available flight condition; and displaying symbology indicative of the simulated reduced power available flight condition.

26 Claims, 32 Drawing Sheets

(56) References Cited

U.S. PATENT DOCUMENTS

| | | | |
|---|---|---|---|
| 4,500,966 A | 2/1985 | Zagranski et al. | |
| 4,673,356 A * | 6/1987 | Schmidt | 434/35 |
| 4,811,255 A | 3/1989 | Kelly, III | |
| 4,817,046 A | 3/1989 | Rice et al. | |
| 4,831,567 A * | 5/1989 | Lea | 703/8 |
| 5,188,511 A * | 2/1993 | Ebert | 416/25 |
| 5,189,620 A | 2/1993 | Parsons et al. | |
| 5,233,542 A | 8/1993 | Hohner et al. | |
| 5,363,317 A | 11/1994 | Rice et al. | |
| 5,566,542 A * | 10/1996 | Chen et al. | 60/775 |
| 5,873,546 A | 2/1999 | Evans et al. | |
| 5,948,023 A | 9/1999 | Evans et al. | |
| 6,488,504 B1 * | 12/2002 | Patterson | 434/33 |
| 6,516,603 B1 * | 2/2003 | Urbach et al. | 60/39.3 |
| 6,568,166 B2 * | 5/2003 | Jay et al. | 60/39.281 |
| 6,607,349 B2 * | 8/2003 | Mulera et al. | 415/1 |
| 6,695,264 B2 | 2/2004 | Schaeffer et al. | |
| 6,742,742 B2 | 6/2004 | Claudet | |
| 6,745,572 B2 * | 6/2004 | Jay et al. | 60/773 |
| 6,807,852 B2 * | 10/2004 | Ranchin | 73/116.01 |
| 6,820,472 B2 * | 11/2004 | Ranchin et al. | 73/116.01 |
| 6,880,784 B1 * | 4/2005 | Wilkinson et al. | 244/76 R |
| 6,917,908 B2 | 7/2005 | Williams | |
| 6,925,809 B2 * | 8/2005 | Mowill | 60/737 |
| 6,954,685 B2 | 10/2005 | Altieri et al. | |
| 7,266,940 B2 * | 9/2007 | Balan et al. | 60/39.181 |
| 7,389,162 B2 * | 6/2008 | Altieri et al. | 701/3 |
| 7,434,764 B2 * | 10/2008 | Lappos et al. | 244/17.11 |
| 7,532,970 B1 * | 5/2009 | Lardillon | 701/100 |
| 7,599,767 B2 * | 10/2009 | Fukuda | 701/4 |
| 7,758,301 B2 * | 7/2010 | Bilson et al. | 415/14 |
| 7,769,521 B2 * | 8/2010 | Gaulmin et al. | 701/100 |
| 7,780,400 B2 * | 8/2010 | Bilson | 415/9 |
| 8,594,864 B2 * | 11/2013 | Greenfield | B64D 31/04 244/175 |
| 2003/0094539 A1 | 5/2003 | Schaeffer et al. | |
| 2004/0020214 A1 * | 2/2004 | Pisano et al. | 60/772 |
| 2004/0088991 A1 * | 5/2004 | Gallant et al. | 60/772 |
| 2004/0103637 A1 * | 6/2004 | Maisotsenko et al. | 60/39.59 |
| 2005/0234689 A1 | 10/2005 | Gates et al. | |
| 2007/0051087 A1 * | 3/2007 | Rom et al. | 60/39.6 |
| 2007/0125905 A1 * | 6/2007 | Fukuda | 244/23 A |
| 2008/0245050 A1 * | 10/2008 | Wollenweber | 60/39.15 |
| 2013/0203021 A1 * | 8/2013 | Beaud | G09B 5/00 434/35 |

OTHER PUBLICATIONS

Extended European Search Report for European Application No. 08872452.1 dated Mar. 19, 2014.

* cited by examiner

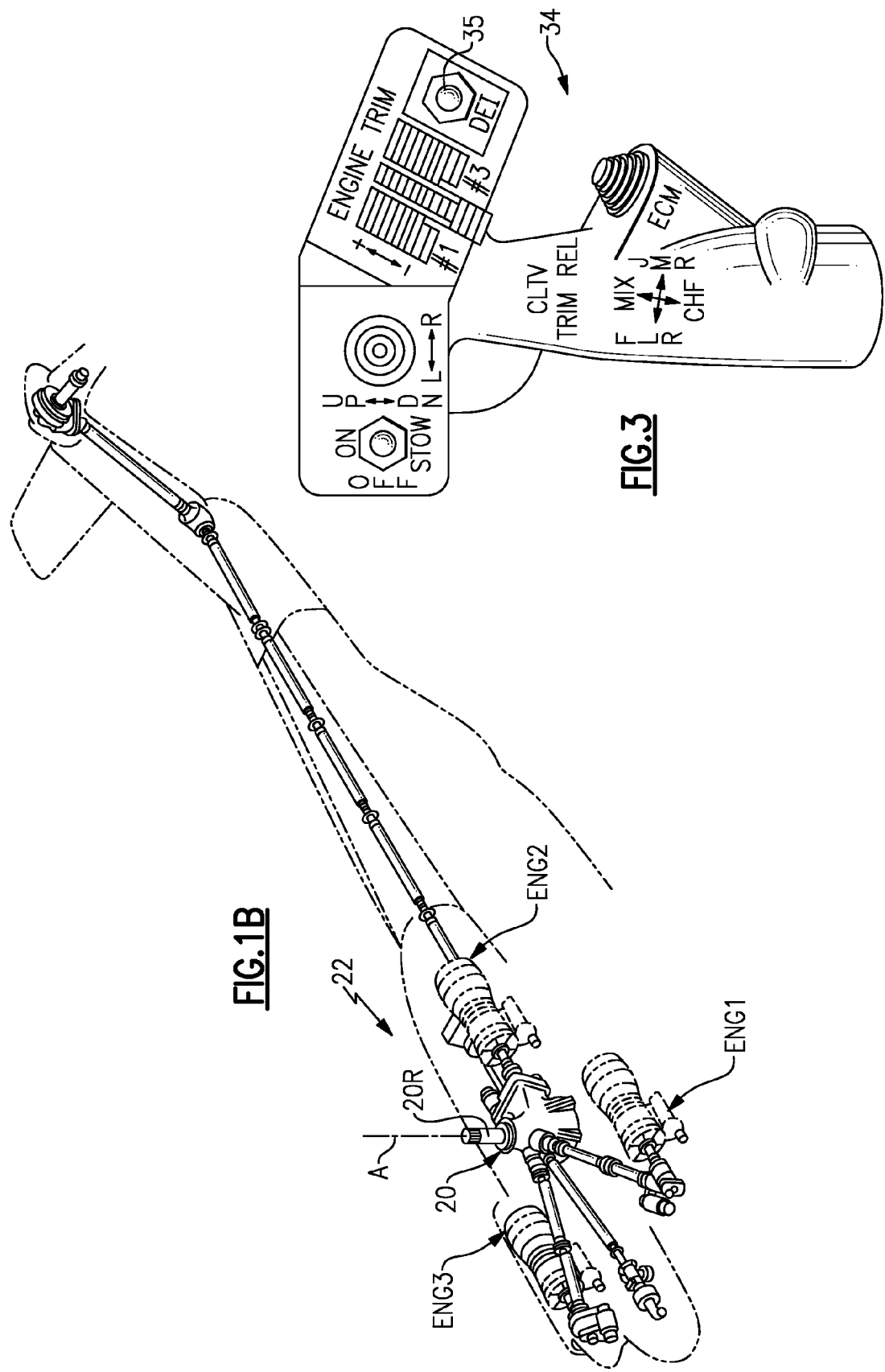

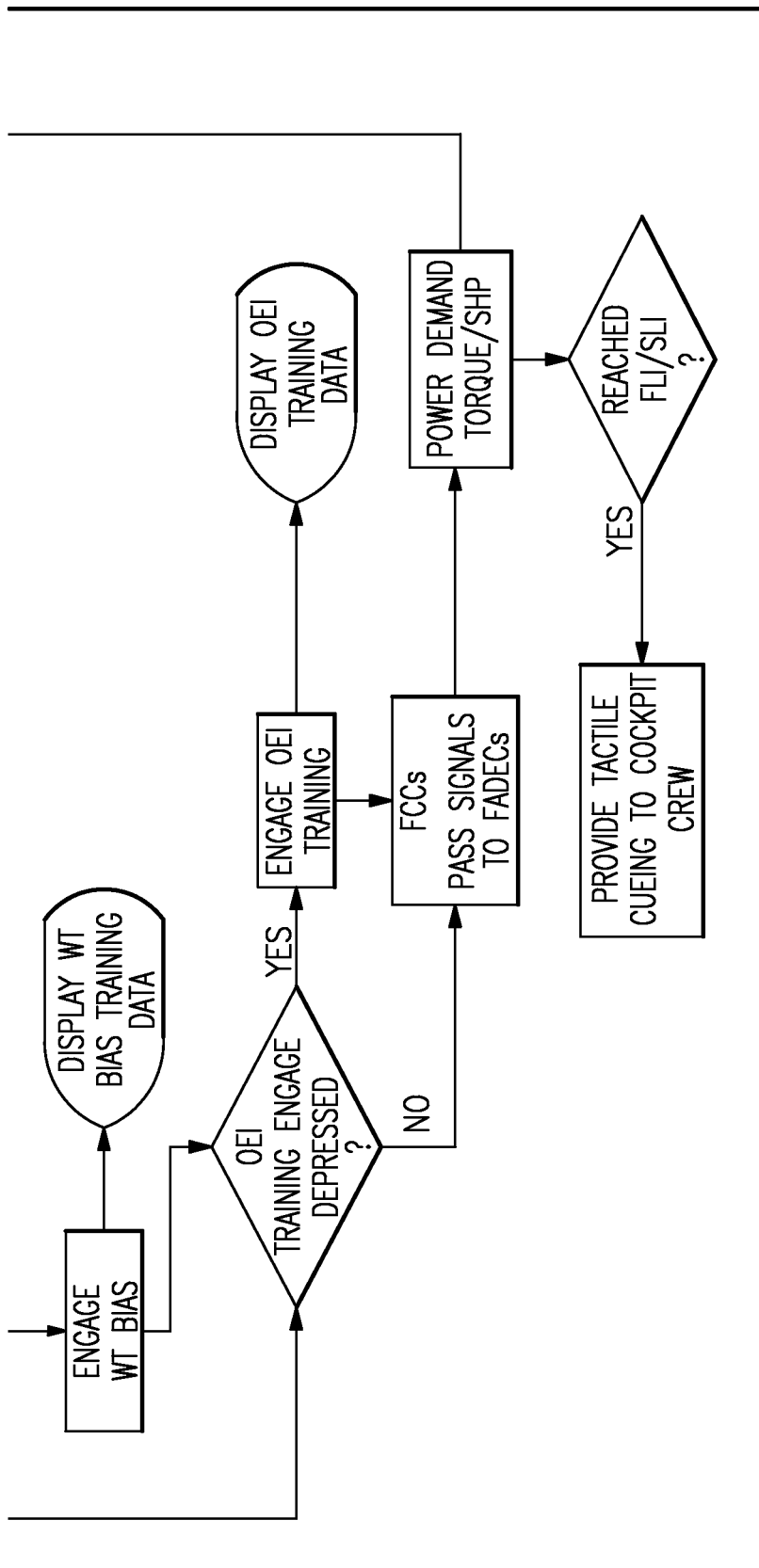
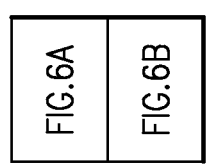
FIG. 6

MODULES AND METHODS FOR BIASING POWER TO A MULTI-ENGINE POWER PLANT SUITABLE FOR ONE ENGINE INOPERATIVE FLIGHT PROCEDURE TRAINING

STATEMENT REGARDING FEDERALLY SPONSORED RESEARCH OR DEVELOPMENT

This invention was made with government support with the United States Navy under Contract No.: N00019-06-C-0081. The government therefore has certain rights in this invention.

BACKGROUND

The present invention relates generally to multi-engine rotary-wing aircraft, and more specifically, to modules and methods for biasing power to a multi-engine power plant, e.g., for conducting one engine inoperative (OEI) and weight bias flight procedures training therefor.

Many rotary-wing aircraft operate with a multi-engine powerplant system which provides sufficient power to facilitate continued flight operations in safety even in the event of a one engine inoperative (OEI) condition. Although an OEI condition is statistically a low-occurrence event, OEI training is employed to facilitate aircrew proficiency in the execution of power limited procedures when high fidelity simulators are not available such as when military aircrews are forward deployed.

One current commercial dual engine OEI training system simulates a higher aircraft gross weight by applying a fixed bias to depress one engine and artificially limit power available. The fixed bias increases proportional to load demand so as to allow an aircrew to safely enter into the OEI portion of training without exceeding actual engine parameters that may result in engine damage.

Current fixed bias commercial OEI training systems adequately simulate power limited procedures but require strict flight manual procedures so as to avoid entry into an unrecoverable rotor droop situation and/or a high sink rate descent. The fixed bias system requires an extensive preflight plan to determine the training aircraft gross weight (Training AGW) at which training can safely be performed.

Aircraft Gross Weight (AGW), ambient temperatures and pressure altitude determine the aircraft power requirements, such that at the training weight the fixed bias will either result in a small excess power margin or a deficit in excess power margin which simulates an OEI condition. A Weight, Altitude and Temperature (WAT) curve, using current ambient conditions, allows the aircrew to calculate the Training AGW during preflight planning for the given ambient conditions. This calculated Training AGW will assure an artificially biased power margin that allows for rotor droop yet will restrain the rate of descent associated with that rotor droop at a recoverable level. To confirm that the proper Training AGW is calculated and adhered to for maximum safety, the aircrew typically requires access to an aircraft flight manual. The aircrew must then burn down fuel to the Training AGW calculated during preflight.

Deployed military aircrews without such commercial OEI training systems often train for engine failures, high gross weight and/or high and hot operations through various instructor techniques. One technique is accomplished by physically retarding a Speed Control Lever (SCL) on an engine quadrant or by beeping back individual engine(s) with the ENGINE TRIM switches so that an instructor pilot can limit the actual engine power available to the pilot under instruction. Another technique is self-imposed power limiting to a given torque value to simulate a heavy condition. The self-imposed power limiting technique may be of limited training effectiveness as there is no actual aircraft response in the form of rotor droop should the self-imposed power limits be exceeded.

Although effective, such techniques also require significant preflight planning to execute. The training itself may also be limited by the chain of command, which often restricts aircrews from utilizing these training techniques in a takeoff or landing profile.

From a maintenance perspective, these current OEI training techniques may also asymmetrically load inputs to a main gear box (MGB, or Main Rotor Gearbox) with a transient torque spike when automatic kickout occurs at low rotor speed (Nr) and high power collective settings.

SUMMARY

A method for conducting flight procedures training in a rotary-wing aircraft with a multi-engine powerplant according to an exemplary aspect of the present invention includes: determining an available power margin of the multi-engine powerplant; determining a variable bias relative the available power margin to simulates a reduced power available flight condition; and displaying symbology indicative of the simulated reduced power available flight condition.

A module for conducting flight procedures training in a rotary-wing aircraft according to an exemplary aspect of the present invention includes: a multi-engine powerplant system; a cockpit instrument display system; and an OEI/BIAS training system in communication with the multi-engine powerplant system and the cockpit instrument display system, the OEI/BIAS training system operable to determine a variable bias relative to an available power margin and simulates a reduced power available flight condition.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 1B is a partial phantom view of a rotary-wing aircraft illustrating a powerplant system;

FIG. 3 is a schematic perspective view of a collective stick for use with one non-limiting embodiment of the present invention;

DETAILED DESCRIPTION OF THE EXEMPLARY EMBODIMENTS

Figure 1A:
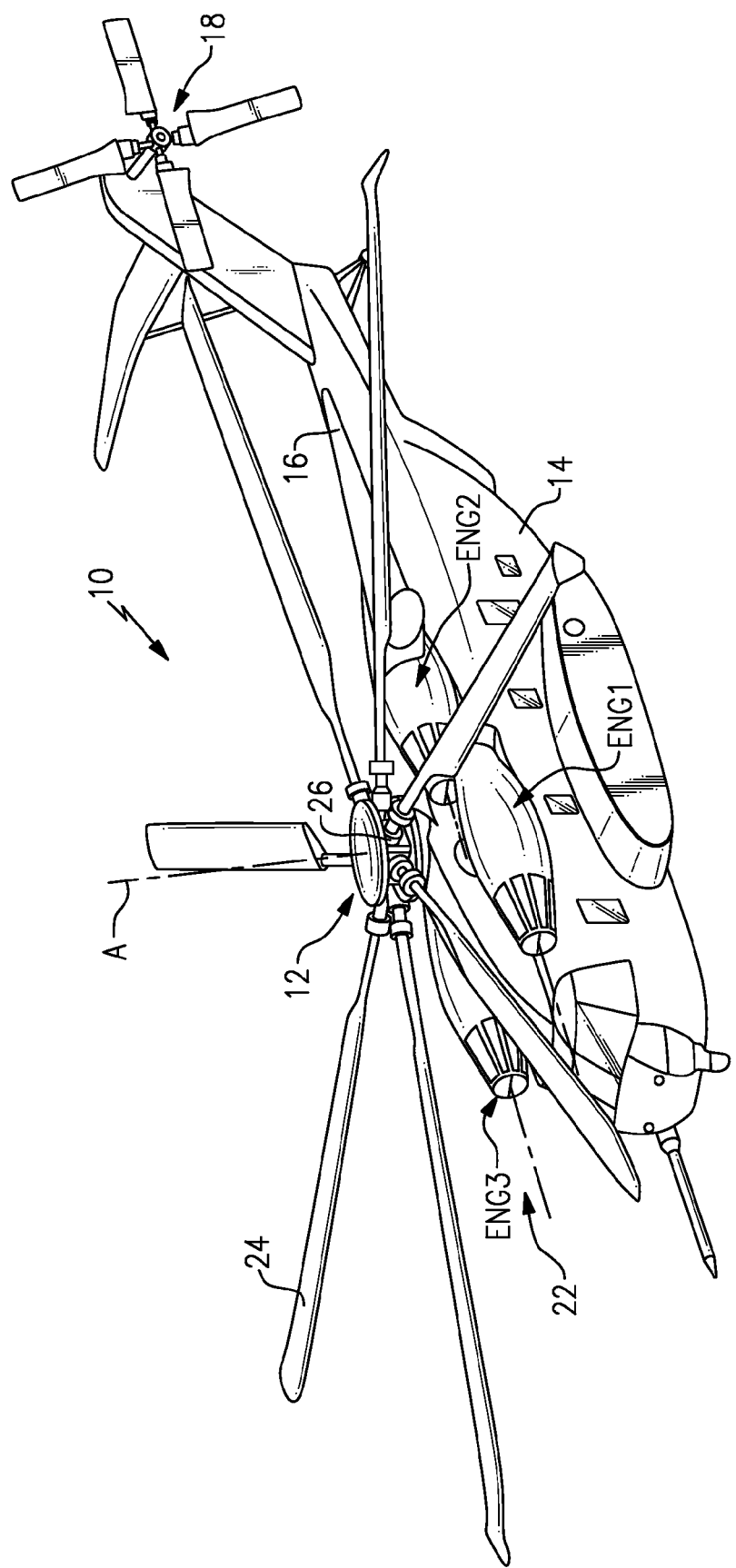
FIG. 1A is a general perspective view of an exemplarily rotary-wing aircraft for use with one non-limiting embodiment of the present invention.

FIG. 1A schematically illustrates a rotary-wing aircraft 10 having a main rotor system 12. The aircraft 10 includes an airframe 14 having an extending tail 16 which mounts an anti-torque system 18. The main rotor assembly 12 is driven about an axis of rotation A through a MGB 20 (FIG. 1B) by a multi-engine powerplant system 22—here having thee engine packages ENG1, ENG2, ENG3. The multi-engine powerplant system 22 is integrated with the MGB 20 which drives the main rotor assembly 12 and the anti-torque system 18. The multi-engine powerplant system 22 generates the power available for flight operations and couples such power to the main rotor assembly 12 through the MGB. The main rotor system 12 includes a multiple of rotor blades 24 mounted to a rotor hub 26. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors and tilt-wing aircraft, will also benefit from the present invention.

To facilitate a fuller appreciation of the operation of the exemplary powerplant system 22 described in the preceding paragraph, the functional features and characteristics of the powerplant system 22 are further described herein in terms of a powerplant system for a CH-53K helicopter (CH-53K is a registered trademark of the Sikorsky Aircraft Corporation) manufactured by Sikorsky Aircraft Corporation. One skilled in the art will appreciate that the ensuing discussion is generally applicable to other multi-engine rotary-wing aircraft and the functional features and characteristics thereof that are associated with OEI flight operations.

Figure 2:
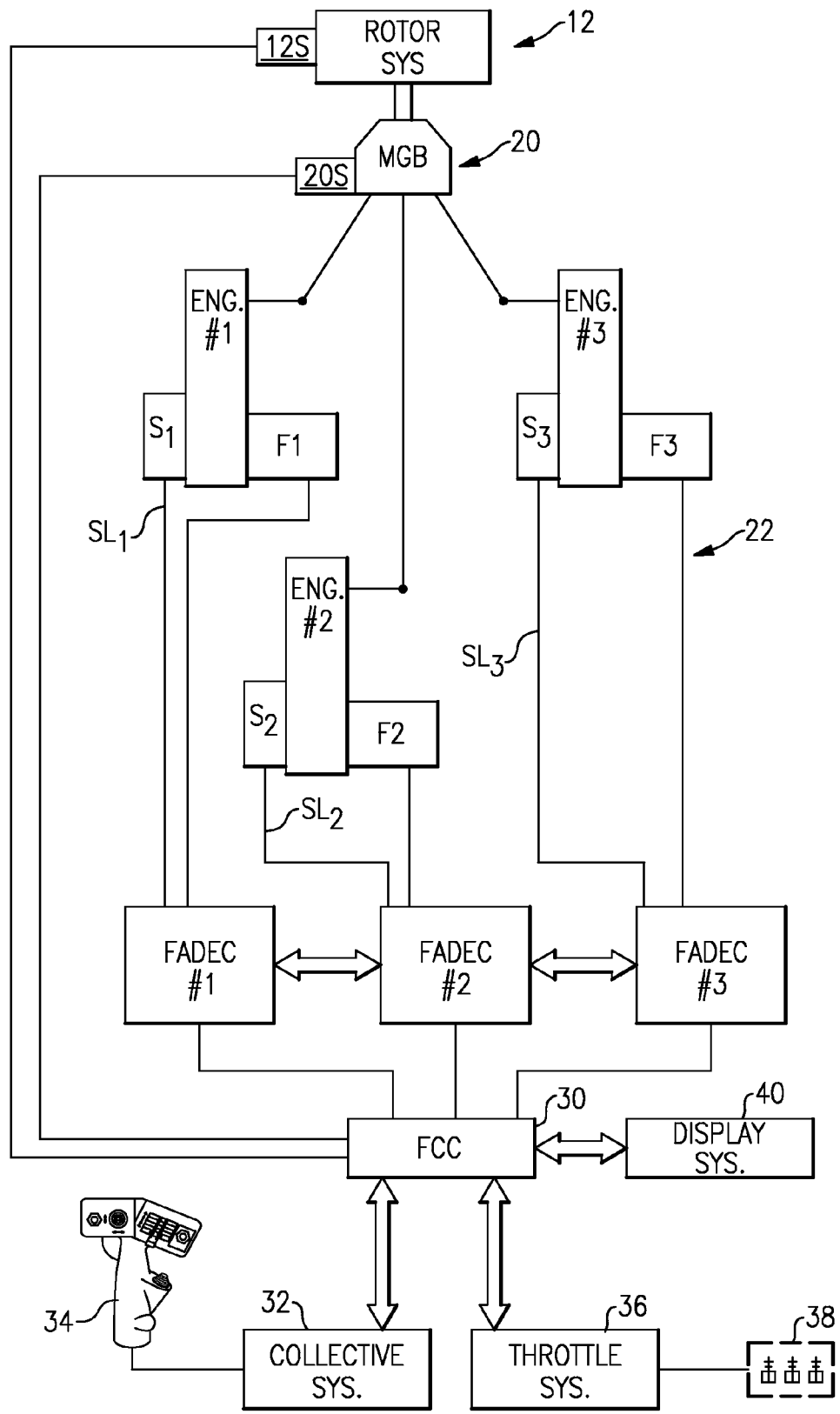
FIG. 2 is a schematic block diagram of a powerplant system.

Referring to FIG. 2, the powerplant system 22 includes the engine packages ENG1, ENG2, ENG3, a fuel subsystem F1, F2, F3 fluidically interconnected to each engine ENG1, ENG2, ENG3. A set of sensors S1, S2, S3 are associated with each engine package ENG1, ENG2, ENG3, and fuel subsystems F1, F2, F3 for monitoring the operating parameters thereof. Digital electronic control units such as Full Authority Digital Engine Controls FADEC1, FADEC2, FADEC3 may be electronically interconnected to the corresponding fuel subsystems F1, F2, F3 to control operation of the engine packages ENG1, ENG2, ENG3, respectively. FADEC1, FADEC2, FADEC3, are electronically interconnected to the respective fuel subsystems F1, F2, F3 and electronically interconnected for failsafe operations. A set of signal lines SL1, SL2, SL3 electronically interconnect each sensor suites S1, S2, S3 to the respective FADEC1, FADEC2, FADEC3, and to a central flight control computer (FCC) 30. Although the FCC 30 is schematically illustrated as a single block, it should be understood that the FCC 30 herein may include multiple computers having multiple channels and multiple redundant subsystems.

A cockpit instrument display system 40 that typically includes one or more analog and/or digital displays is in electrical communication with the FCC 30. The cockpit instrument display system 40 operates to control avionics and to display data therefrom as symbology to interface with an aircrew. Although the cockpit instrument display system 40 is illustrated as a single block, it should be understood that the cockpit instrument display system 40 may include multiple subsystems such as data concentrator units (DCUs), multi-function displays (MFDs), primary flight displays (PFDs) and other systems often as line replaceable units (LRUs).

The sensor suites S1, S2, S3 monitor selected operating parameters of the engine packages ENG1, ENG2, ENG3 and generate signals representative of such operations for multi-engine flight operations, and OEI/BIAS training flight operations. Each sensor suite S1, S2, S3 may include, in one non-limiting embodiment, sensors which monitor: engine gas generator speed (N1 expressed as a percentage); engine power turbine speed (N2 expressed as a percentage); engine torque (Q expressed as a percentage); and engine power turbine gas temperature (TGT expressed in degrees Centigrade). The sensor suites S1, S2, S3 may include additional, alternative, and redundant sensors as generally understood. Signals generated by the sensor suites S1, S2, S3 are coupled to the corresponding FADEC1, FADEC2, FADEC3 and the FCC 30 for display on the cockpit instrument display system 40.

A main rotor gearbox sensor suite 20S is integrated in combination with the MGB 20 to monitor the torque output therefrom so that generate signals representative of the torque output (W) are transmitted to the FCC 30. A rotor system sensor suite 12S is integrated in combination with the main rotor system 12 to monitor the rotational speed of the main rotor shaft so then signals representative of the rotational speed of the main rotor shaft Nr are transmitted to the FCC 30. The sensor suite 20S at least monitors transmission torque and the sensor suite 12S at least monitors the revolutions per minute of the main rotor shaft 20R (FIG. 1B). Signals from these sensor suites 12S, 20S are coupled to corresponding parametric indicators (Q expressed as a percentage), (Nr expressed as a percentage) by the FCC 30 for display on the cockpit instrument display system 40.

The cockpit instrument display system 40 may include individual display symbology for each engine such as: NP1 tachometers; NP2 tachometers; NP3 tachometers; individual torquemeters for displaying the engine torque Q generated by each engine; and individual TGT indicators as well as additional or alternative displays. The cockpit instrument display system 40 may be digital, analog, or a combination of both.

The FADECs may, in one non-limiting embodiment be dual channel, fail fixed computer systems that electronically control the operation of the engine fuel subsystems F1, F2, F3 to regulate the flow of fuel to the engines ENG1, ENG2, ENG3 to control the functioning of the engines ENG1, ENG2, ENG3 during multi-engine flight operations, OEI flight operations and OEI/BIAS flight training operations. FADEC1, FADEC2, FADEC3, are operative to control, inter alia, the following functions for the respective engine ENG1, ENG2, ENG3 in response to the FCC 30:

automatic engine start including the acceleration of the engines up to idle;
acceleration of the engines from ground idle to flight position;
automatic control of gas generator and free turbine rotation speeds (NP1, NP2, NP3) to maintain a desired rotational speed Nr of the main rotor shaft;
automatic load sharing between engines;
automatic fault accommodation;
fail fixed control upon detection of a FADEC major fault;
automatic limiting of engine power ratings to design power ratings during dual-engine flight operations;
automatic limiting of engine power ratings to desired OEI/BIAS power ratings during OEI/BIAS training flight operations;
overspeed protection;
normal engine shutdown;
early warning of a one engine inoperative or dual engine inoperative condition;
power turbine and gas generator cycle counting; and
automated engine power assurance checks.

It should be understood that additional or alternative functions may be controlled.

Figure 4:
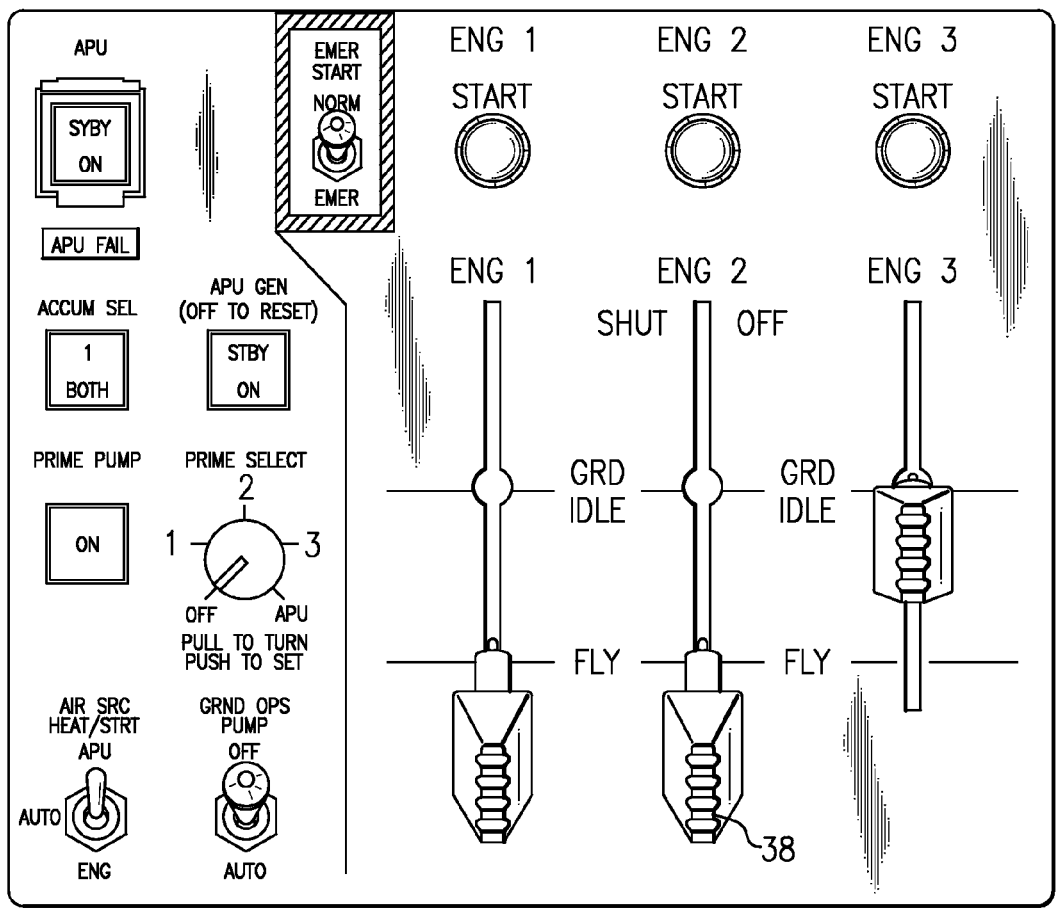
FIG. 4 is a schematic perspective view of a throttle quadrant for use with one non-limiting embodiment of the present invention

Aircrew control inputs to the multi-engine powerplant system 22 to control flight operations are effected at least through a collective active inceptor system 32 including a collective stick 34 (FIG. 3) and/or a throttle system 36 including a Speed Control Lever (SCL) system 38 (FIG. 4) which are in electrical communication with the FCC 30. The collective stick 34 (FIG. 3) is articulated by the pilot to transmit control signals to the rotor system 12 to collectively control the pitch of the rotor blades 24 of the rotor system 12 and to transmit corresponding signals to the FADECs to coordinate the power output of the engines ENG1, ENG2, ENG3 with the corresponding collective pitch input to the rotor blades 24. The throttle system 36 also allows control of the multi-engine powerplant system 22.

Figure 5:
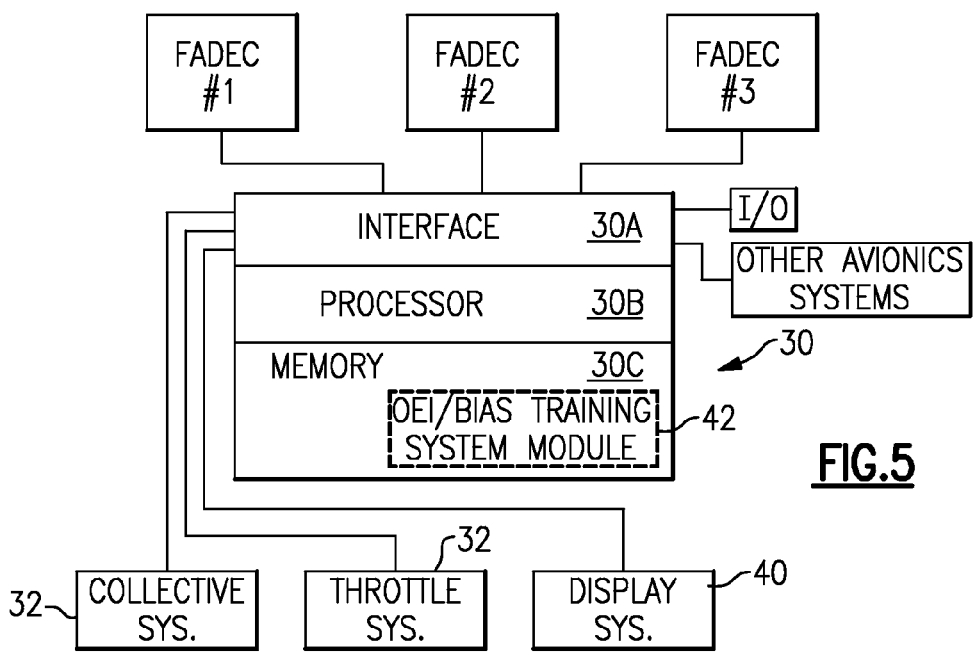
FIG. 5 is a schematic block diagram of a controller for use with one non-limiting embodiment of the present invention.

Referring to FIG. 5, the FCC 30 includes an OEI/Bias training module 42. The OEI/Bias training module 42 communicates with the FCC 30 to obtain aircraft dynamic state, Max continuous Power (MCP), Max Power available (MPA), Aircraft Gross Weight (AGW), ambient conditions as well as other data.

The FCC 30 typically includes a processor 30A, a memory 30B, and an interface 30C for communicating with other avionics systems and components such as the FADECs, the collective active inceptor system 32, the throttle system 36, and the cockpit instrument display system 40. The FCC 30 stores data and control algorithms such as OEI/Bias training software for the OEI/Bias training module 42 in the memory device 30C or other computer readable medium for operation of the process 30A. The stored data and control algorithms are the scheme by which decisions are made to perform operations disclosed herein.

Aircraft gross weight (AGW), ambient conditions, and engine power assurance calculations data is structured to be accessed by the FCC 30 and thus the FADECs for calculation of OEI parameters for input to the OEI/Bias training module 42. Data such as aircraft gross weight (AGW), engine power available, ambient temperature and pressure altitude is utilized to calculate the excess power margin under any payload configuration by the OEI/Bias training module 42. The OEI/Bias training module 42 utilizes this data to determine the variable bias to simulate the desired training requirements. It should be understood that alternative and/or additional data may also be utilized.

The OEI/Bias training module 42 also utilizes data of known excess power margin for any flight condition, such as that often displayed as in a power available look-up table. In the disclosed non-limiting embodiment, the following data is available to the OEI/Bias training module 42 through the FCC 30 and other processors. It should be understood that alternative and/or additional data may also be utilized. Excess power margin will vary greatly with payload configuration, operating altitude and ambient temperatures. In order to simulate a heavy gross weight all engines operating (AEO) condition, the OEI/Bias training module 42 will decrease the excess power margin through variable biased parameters to close the excess power margin gap to a desired value.

The OEI/Bias training module 42 essentially allows the aircrew to enter training without detailed preflight planning and without direct access to a flight manual. OEI/BIAS training is also essentially the same in any environment or configuration such that an aircrew selected weight, engine operation and/or ambient environment condition simulates the resultant excess gross weight. OEI training provided by the OEI/Bias training module 42 simulates the aircraft condition with all three engines operating at the same speed but in some instances horsepower limited should the selected training condition result in a rotor droop condition. Essentially, in such a rotor droop condition, all engines will be horsepower limited to deliver reduced horsepower to simulate the desired weight bias condition and/or operations limited to the output of two (or one) engine(s) to simulate an OEI condition. In other words, a negligible excess power margin or a power deficit condition is simulated in response to the desired training condition with respect to power available.

For example only, power available at sea level for all engine operating (AEO) training is 100 percent while power required for hover is, for example only, 60 percent which results in a 40 percent excess power margin. In order to train for an AEO heavy lift condition, a much smaller power margin is required. The OEI/Bias training module 42 will variably bias the aircraft multi-engine powerplant system 22 to achieve the simulated power margin associated with the selected OEI/Bias AGW condition. If the same aircraft is training in high and hot conditions, such as operations at 9000 feet, the available power margin would be less than the previous example, perhaps producing a power deficit condition and associated rotor droop. That is, although power available at the high and hot condition for AEO training is now less than 100 percent, the actual power required for hover may be 105 percent. The OEI/Bias training module 42 will thereby variably biases the cockpit instrument display system 40 to the power deficit condition and result in a rotor droop condition.

If the aircraft is already in an actual power limited condition due to, for example only, payload configuration, operating altitude and/or ambient temperatures, the OEI/Bias training module 42 precludes training due to the nominal excess power margin which actually exists.

Future rotary-wing aircraft designed for heavy lift will have inordinate excess power margins when operating in an empty cargo configuration (AGW) during which training typically occurs. This essentially negates the ability to sufficiently depress power available. That is, even by limiting the power available from one or two engines, the aircraft will still have such a significant excess power margin when operating in an empty cargo configuration—especially at SLSD—current training techniques may be inadequate. This is particularly acute for rotary-wing aircraft that operates at a wide range of mission weights with a three engine powerplant system that provides exceedingly large excess power margins.

Figure 6A:
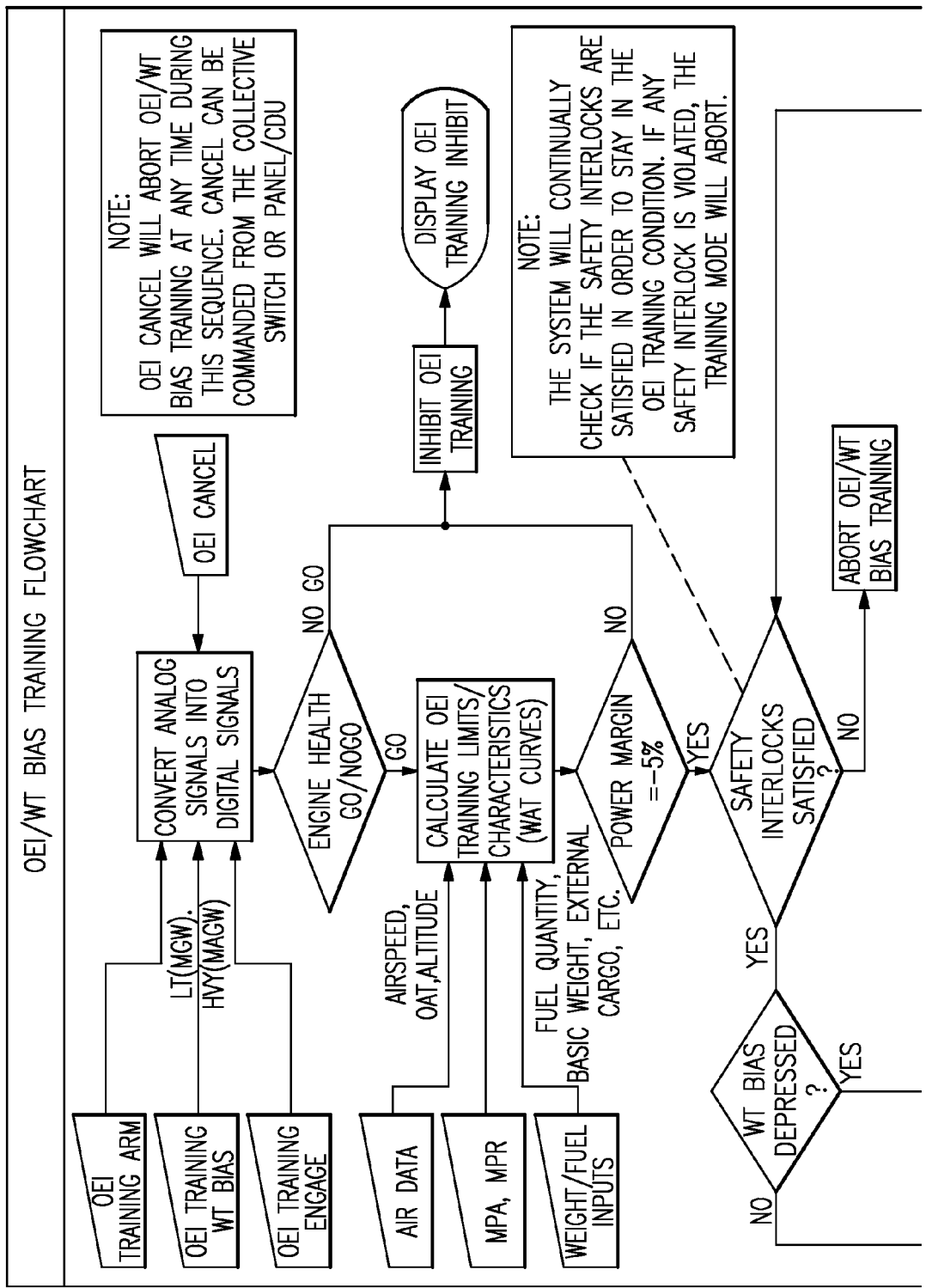
FIG. 6 is a flowchart which illustrates operation of the OEI/Bias training module.

Due to a heavy lift rotary-wing aircraft wide range in mission weights between maximum gross weight (MGW (e.g., internal weight)) and maximum allowable (MAGW (e.g., internal load plus external load (hook load)))—which may be, for example only, a 14,000 pound difference—two levels of Bias (LT and HVY; FIG. 6) are provided by the OEI/Bias training module 42. The "light" bias (LT; also referred to as LTBIAS), for example only, limits the available power margin to the MGW excess power margin and effectively simulates a full internal load. The heavy bias (HVY; also referred to as HVYBIAS), for example only, limits the available power margin to the MAGW excess power margin and effectively simulates a maximum external load.

If bias (LT or HVY) training is desired, the training symbology for Q and TGT displayed on the cockpit instrument display system 40 will reflect the simulated training excess power margin. That is, the cockpit instrument display system 40 is variably adjusted actively relative to environmental conditions. These predetermined power margins may, for example only, be previously determined by simulation and verified through flight test or otherwise confirmed. It should be understood that although two levels of bias (LT, HVY) are discussed in the disclosed non-limiting embodiment, other levels of bias as well as other excess power margins may additional or alternatively be provided. It should also be understood that an aircrew selectable excess power margin may additional or alternative be provided (see FIG. 7B).

In addition to the simulated bias conditions, simulated OEI conditions are also provided. The basic OEI condition would, for example only, limit the predetermined excess power margin to, the power available of two engines. The "inoperable" engine is randomly selected by the OEI/Bias training module 42 for display by the cockpit instrument display system 40 to further enhance the simulated training.

Referring to FIG. 6, the OEI/Bias training module 42 provides a dynamic real time OEI/BIAS training that allows an aircrew to safely experience a representative rotor droop condition in a take-off or hover flight profile with high-power limited conditions which replicate the feedback and aircraft indications of an actual engine failure where power required exceeds power available (droop) conditions. Combination of weight bias with OEI is also available.

Figure 7A:
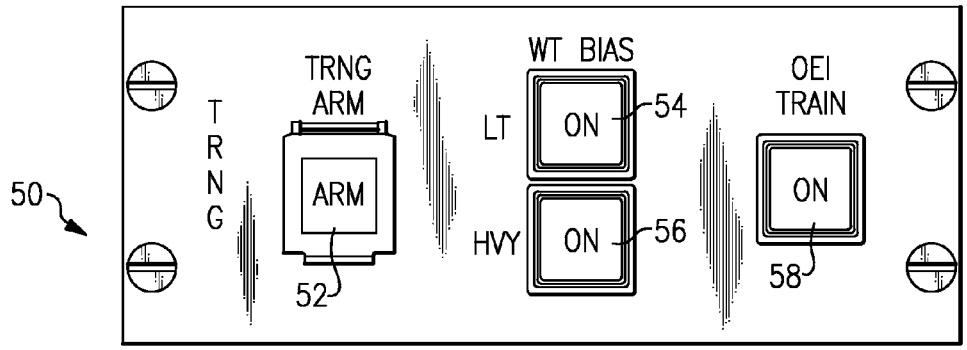
FIG. 7A is a schematic view of one non-limiting embodiment of an OEI/BIAS training panel interface with an OEI/Bias training module for use in a cockpit instrument display system.

Referring to FIG. 7A, an OEI/BIAS panel 50, according to one non-limiting embodiment, is schematically illustrated. The OEI/BIAS training panel 50 may be part of the cockpit instrument display system 40 and operate as an interface with the OEI/Bias training module 42 to select the desired simulated training condition. The OEI/Bias training module 42 may be operated through the following switchology: Training arm switch 52 (TRNG ARM); Weight Bias switches 54, 56 (WT BIAS) and OEI Training switch 58 (OEI Train).

The training arm switch 52 places the OEI/Bias training module 42 in a ready state. This switch must be depressed to ARM before either the OEI TRAIN or WT BIAS switches can be functional. Second activation of the TRNG ARM switch 52 deselects the training mode.

The weight bias switches 54, 56 are operated singly and the operation of one deselects or precludes the simultaneous operation of the other. Selecting LT switch 540N biases all engines of the multi-engine powerplant system 22 to simulate an increase of a desired pounds in aircraft internal gross weight. LT Bias simulates increase in internal gross weight. Selecting HVY switch 56 ON biases all engines of the multi-engine powerplant system 22 simulates internal load combined with external hook load.

Selecting ON for the OEI Training switch 58 (without WT BIAS selected) biases all engines of the multi-engine powerplant system 22 at current ambient conditions and results in a no-BIAS OEI condition. The actual power from all the engines is level-loaded but the engines are equivalently horsepower biased to simulate the OEI condition yet maintain equal inputs to the MGB20. The OEI/Bias training module 42 provides appropriate simulated symbology on the cockpit instrument display system 40 (FIG. 9), as well as randomly selects an engine for simulated failure display. A second depression of the switch 58 deselects training mode.

The engines ENG1, ENG2, ENG3 are equally level-loaded and horsepower biased when controlled for the simulated weight biases and/or OEI engine power available training should such a condition result in a potential rotor droop condition. Engine spool-up delay thereby essentially does not exist because all engines are operating—just potentially at a reduced horsepower—to provide the desired lower main rotor speed (Nr) droop condition, rather than conventional systems which may pull back one engine to idle. For example only, all the engines may be biased to provide 95 percent Nr so that should a possible ground contact situation become present, the aircrew would only experience an all-engine available wave-off at the lower Nr.

Figure 9A:
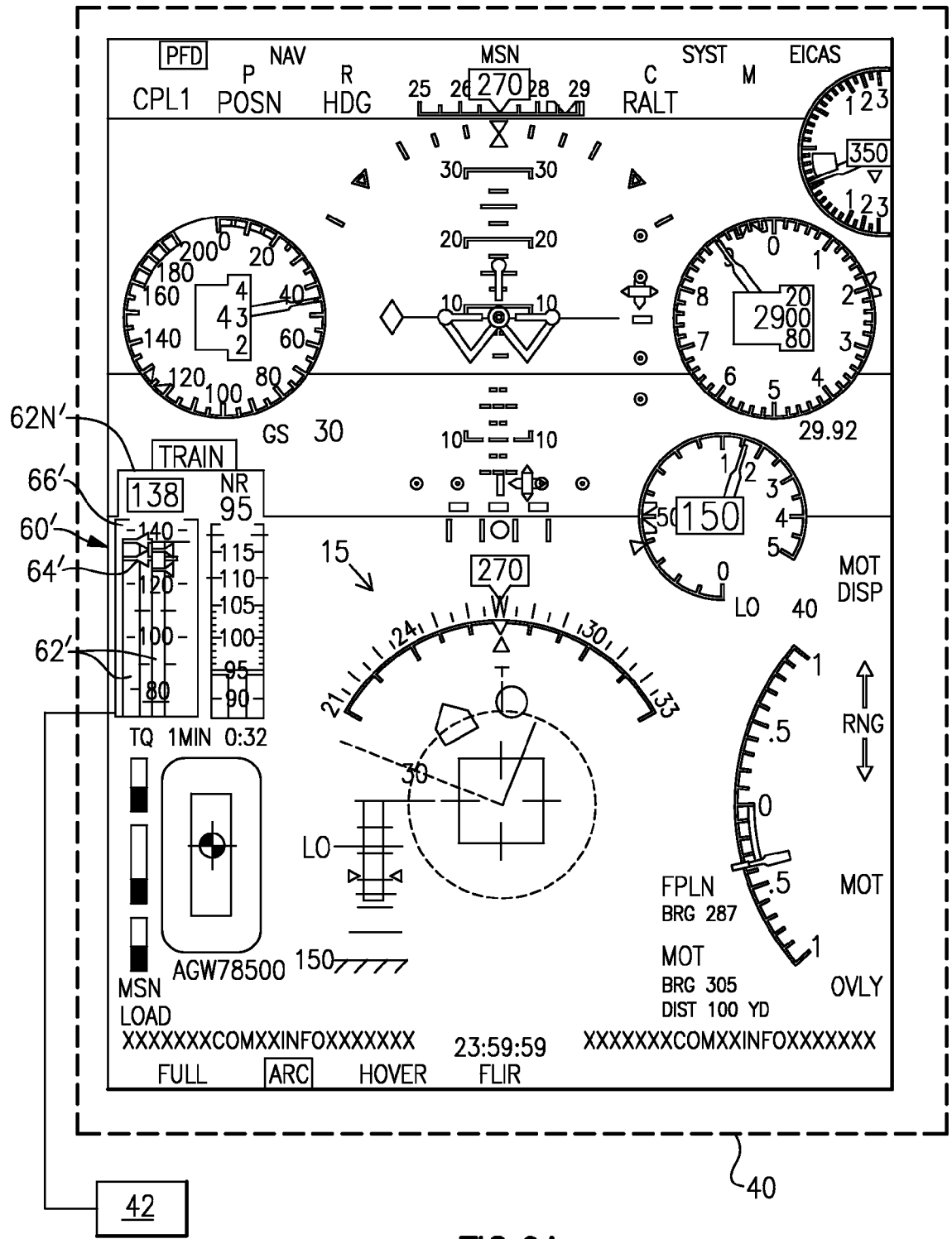
FIG. 9A is a schematic view of one non-limiting embodiment of an expanded TORQUE DISPLAY or QUAD TAC DISPLAY for use with the OEI/Bias training module.
Figure 9B:
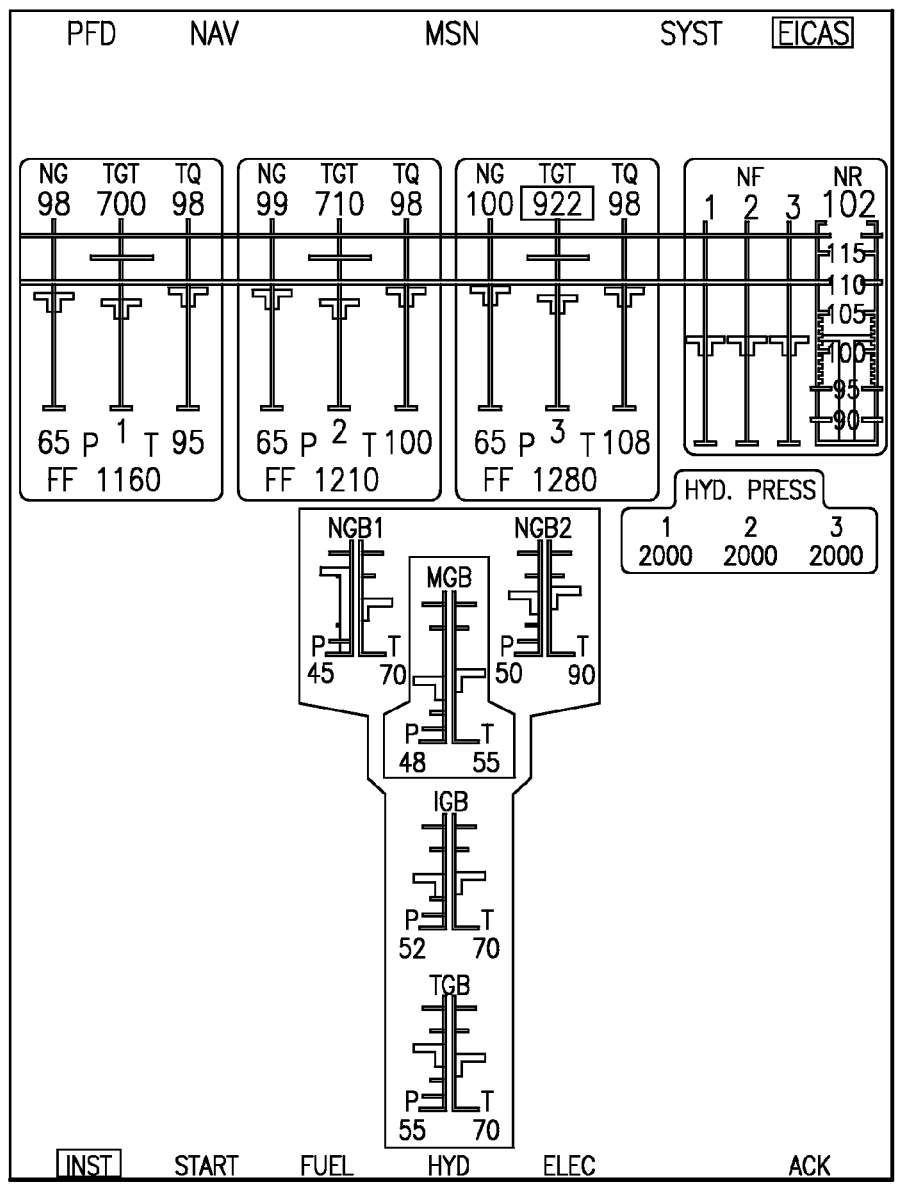
FIG. 9B is a schematic view of an Engine Indicating and Crew Alerting System related to FIG. 9A.

Although the engines are equally level-loaded when biased, the OEI/Bias training module 42 will display the simulated OEI failure symbology or lower power available power margin symbology on the cockpit instrument display system 40 along with a training message such as "TRAIN" over the Display 60 (FIG. 9A, 9B). The OEI/Bias training module 42 provides simulated air vehicle state data on the cockpit instrument display system 40 but may bias the actual engine power percentages through control of the FADECs in response to the OEI/Bias training module 42 training logic output. In other words, when the biased Q and TGT values approach actual MPA limits the engines will be horsepower limited to achieve a rotor droop condition but said engines will always remain torque matched at the lower power output. The OEI/Bias training module 42 will control the cockpit instrument display system 40 to simulate a failed engine producing zero torque (here illustrated as ENG3; FIG. 9A, 9B) while the other two engines are simulated as approaching turbine gas temperature (TGT) limits (10 min, 1 min, and/or other limits; FIG. 9A, 9B). That is, the simulated power limited condition with displays for the simulated power limited condition provided by the OEI/Bias training module 42.

Figure 7B:
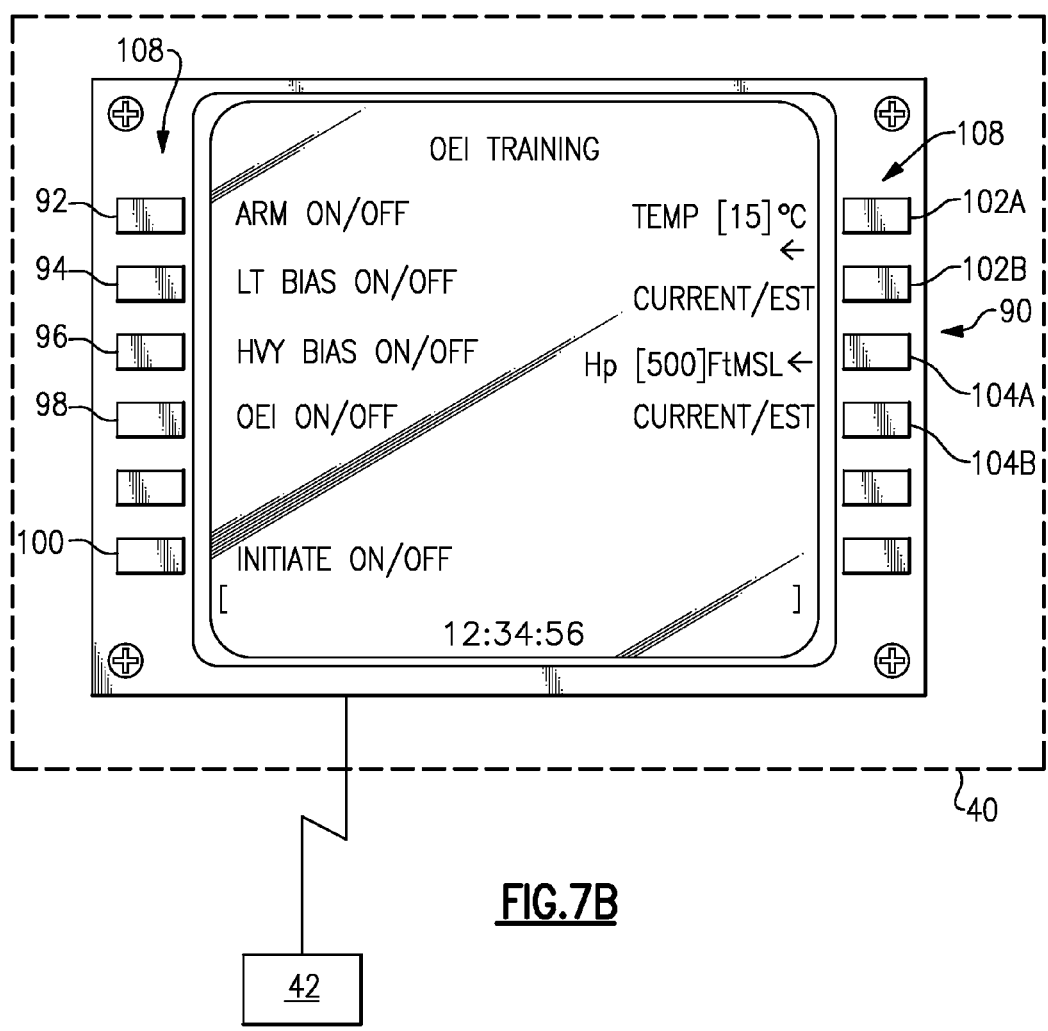
FIG. 7B is a schematic view of one non-limiting embodiment of an OEI/BIAS display interface for use with an OEI/Bias training module in a cockpit instrument display system.

Referring to FIG. 7B, another non-limiting embodiment of an interface with the OEI/Bias training module 42 includes an OEI/BIAS display 90 for display on the cockpit instrument display system 40. The OEI/BIAS display 90 disclosed herein is but one non-limiting embodiment of a page architecture therefore. It should be understood that other page architectures may alternatively or additionally be provided. The OEI/BIAS control display 90 operates as an interface with the OEI/Bias training module 42 to select the desired simulated training condition.

The OEI/BIAS control display 90 includes the following symbology associated with a respective soft switch as is typical of an MFD: ARM 92; LT BIAS 94; HVY BIAS 96; OEI 98; INITIATE 100; TEMP 102A; CURRENT/EST temp select 102B; Hp (Ft MSL) 104A; and CURRENT/EST height select 104B. Respective soft keys 108 may be utilized to select options presented by the symbology while alphanumeric entry may be made through the cockpit instrument display system 40 such as a scratchpad, touch screen or such like.

Defaults on the OEI/BIAS control display 90 are current ambient conditions (CURRENT) but provide for input of a simulated (EST) ambient conditions via the cockpit instrument display system 40. This variable ambient input capability provides for a complete mission training capability, refer to FIG. 16B. The simulated ambient conditions available for entry must conform to the operating envelope of the aircraft and the existing performance charts in the digital architecture. Furthermore, should the aircrew enter values less severe than the current ambient conditions a TRAINING UNAVAILABLE message would be displayed.

TORQUE DISPLAY/QUAD TAC DISPLAY

Figure 8A:
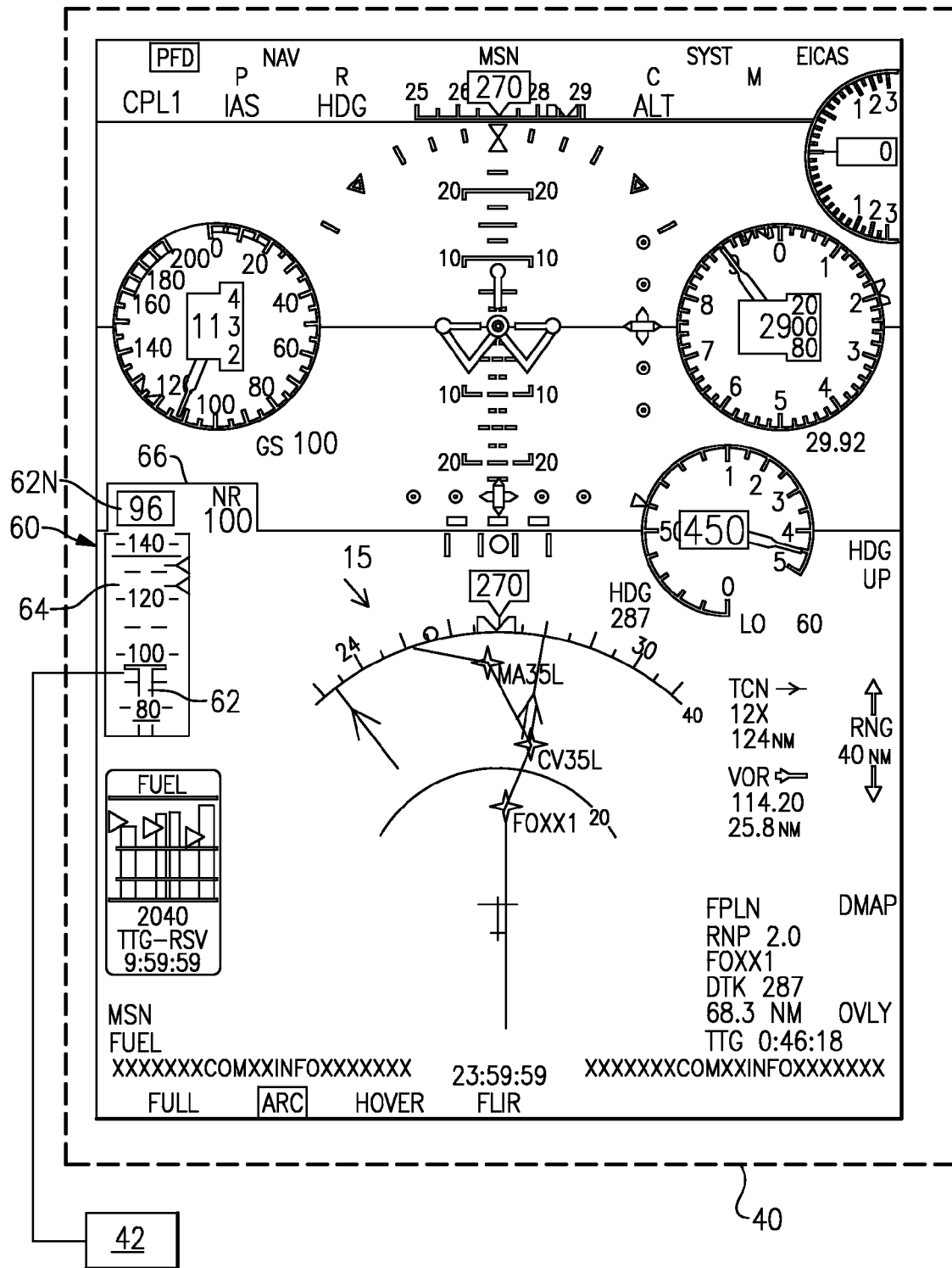
FIG. 8A is a schematic view of one non-limiting embodiment of a TORQUE DISPLAY for use with the OEI/Bias training module.

Referring to FIG. 8A, a TORQUE DISPLAY 60 is displayed on the cockpit instrument display system 40. The TORQUE DISPLAY 60 displays aircraft torque limitations, based on MGB power input limits, referenced to maximum continuous power (MCP) and maximum power available (MPA). In rotary-wing aircraft designed for heavy lift, the engines may be FADEC limited to ensure engine power is limited to the MGB especially with the excess torque available at sea level standard day (SLSTD) conditions. In other words, at SLSTD, where the vast amount of training occurs, the engines will not be TGT limited but rather torque limited by the MGB.

The TORQUE DISPLAY 60 provides an average torque display of all engines as a numeric value 62N, an associated average torque bar 62, a first limit carrot 64 and a second limit carrot 66 that reference either a maximum torque value for the MGB (for example 10 min and 1 min limits) or under some higher hot conditions the limit carrots 62, 64 reference a maximum TGT rating (for example only, 10 min and 1.0 min limits). In either case, the aircrew is only concerned with how much torque can be pulled as pull is directly related to collective input. It should be understood that additional or alternative limits such as Fuel flow (Wf), gas generator speed (Ng) or such like may alternatively or additionally be provided. The TORQUE DISPLAY 60 may be displayed on a PFD which is displayed on the outboard MFD of the cockpit instrument display system 40 to display the flight state data to operate the aircraft under any flight condition.

The TORQUE DISPLAY 60 is a power setting reference, and has a fairly linear relationship to airspeed and/or engine limitations. Because of the torque relationship to dynamic flight states at various gross weights and ambient conditions, pilots routinely reference torque (power setting) to fly specific airspeeds. The torque value required to maintain a given flight parameter when subtracted from the calculated power available facilities determination of the excess power available for a given flight regime.

Power Available−Power Required=Power Margin (PM)   [1]

The TGT and Q required can be correlated to produce the predicted values of maximum continuous power (MCP) and maximum power available (MPA) displayed by the first limit indicator (FLI) carrot (62; which would typically be color coded yellow) and second limit indicator (SLI) carrot (64; which would typically be color coded red) on the TORQUE DISPLAY 60. This calculation increases in fidelity as higher power demands are approached. In effect, the aircrew will not have to perform power checks before performing high power tasks. As the aircrew approaches the temperature limits of the engine or torque limits of the MGB, these limits become apparent on the TORQUE DISPLAY 60. In the case of SLSTD, the FLI carrot 62 and the SLI carrot 64 typically coincides with a determined torque limit. However, on a high hot day, the FLI carrot 62 and the SLI carrot 64 typically coincides with a torque value below MGB limits such that the FLI carrot 62 and the SLI carrot 64 are associated with a thermal TGT limit. The SLI time indicator may appear in the counter window below the TORQUE DISPLAY (FIG. 9). The air vehicle state data from the FCC 30 provides the OEI/Bias training module 42 with the actual aircraft and actual ambient conditions to implement for the TORQUE DISPLAY 60.

Torque values equated to TGT and Q required are respectively displayed by the FLI carrot (62; which would typically be color coded yellow) and SLI carrot (64; which would typically be color coded red). For example only, the TORQUE DISPLAY 60 illustrates a power available of 133 percent Q (SLI carrot 66). The current power required equals 96 percent. The power margin for this state is therefore 133 percent-96 percent which equals a 37 percent torque excess power margin. This excess power margin represents potential additional weight in the form of cargo or fuel that the aircraft is capable of lifting at the given ambient conditions.

Referring to FIG. 9A, the cockpit instrument display system 40 may expand the TORQUE DISPLAY 60 to a QUAD TAC DISPLAY 60' when the rotor speed Nr is below a normal governed state. The QUAD TAC DISPLAY 60' provides individual torque for each of the engine packages ENG1, ENG2, ENG3 and rotor speed (Nr) in response to the OEI/Bias training module 42. An actual OEI condition or other low rotor speed condition when rotor speed (Nr) drops below the normal governed rotor speed (for example only, 103 percent Nr) to further indicate the rotor drooped condition and provide additional feedback to the aircrew.

The torque section of the QUAD TAC DISPLAY 60' also expands to illustrate a bar 62 which display torque for each engine with a total output as the numeric value 62N. The QUAD TAC DISPLAY 60' is illustrated in the training mode (TRAIN) in which ENG1 and ENG2 are producing 138 percent Q while ENG3 is at zero percent Q, i.e., simulated as inoperative (also displayed on the Engine Indicating and Crew Alerting System FIG. 9B). Notably, although the instrument displays that ENG3 is at zero torque, all engines are actually torque matched but will operating at a reduced horsepower when the dual engine (Biased) power required exceeds power available. A one (1) minute countdown (currently at 0:32) is also provided to simulate that the engines are operating within their 1 minute torque limit.

Figure 8B:
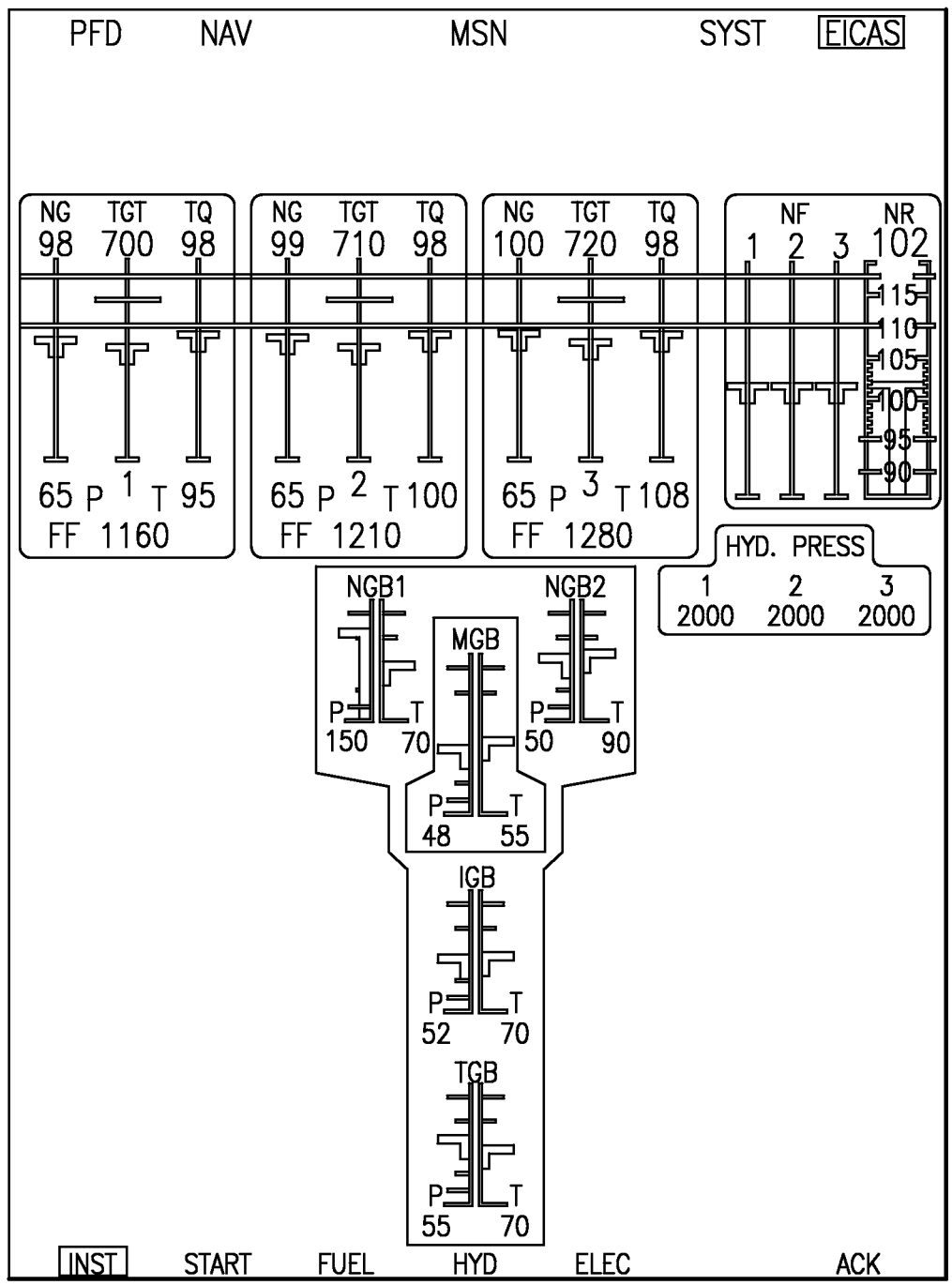
FIG. 8B is a schematic view of an Engine Indicating and Crew Alerting System related to FIG. 8A.
Figure 10:
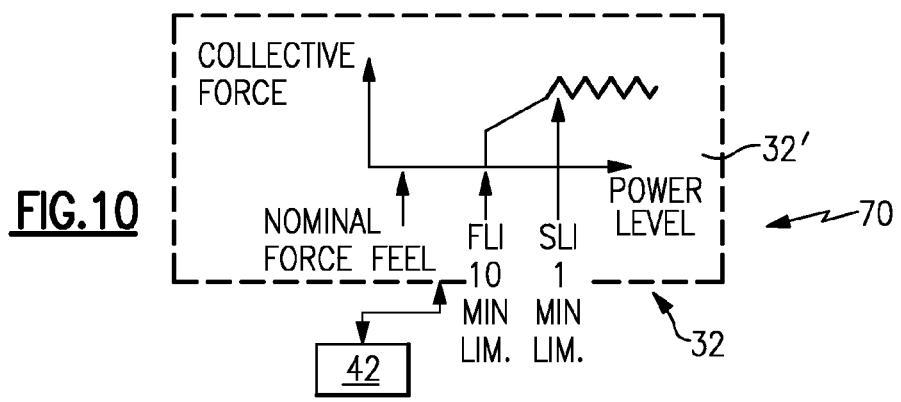
FIG. 10 illustrates a schematic block diagram of one non-limiting embodiment of a tactile cueing system for use with the OEI/Bias training module.

Referring to FIG. 10, a tactile cueing system 70, may also be utilized to increase pilot awareness of engine limitations. Tactile cues from the tactile cueing system 70 modify the force-feel of the collective stick 34 such that the aircrew will feel an impending engine limit. For example only, a collective soft-stop and ramp cue introduced at a first limit indicator power setting (FLI) as represented by the first limit carrot 62 (FIGS. 8 and 9) and a stick-shaker cue introduced at a second limit indicator power setting (SLI) as represented by the second limit carrot 64 (FIGS. 8 and 9). The tactile cueing system 70 operates in response to the OEI/Bias training module 42 in response to the simulated engine power available. That is, in addition to the tactile cueing system 70 being operative during AEO conditions, the tactile cueing system 70 will operate in response to the OEI/BIAS Training Module 42 such that the collective stick 34 operates much like under actual conditions.

Training Deselect and Safety REQUIREMENTS

All training sequences can be exited manually, with a second depression of the OEI Train switch 58 or the ARM switch 52 (FIGS. 7A and 7B). Training can also be exited through activation of an OEI switch 35 on either collective stick 34 (FIG. 3). The OEI switch 35 may additionally control all operating modes for the OEI/Bias training module 42 as well as terminate all training modes selected and return engines and display parameters to normal operation and actual values. The collective stick 34 (FIG. 3) located OEI switch 35 permits rapid recovery without the aircrew having to initiate the recovery commands through the control panel 50 (FIG. 7A) or MFD display (FIG. 7B).

In addition to the manual deselect of training, the following Safety requirements, as well as other, different or additional safety requirements may be required by the OEI/Bias training module 42 for training to proceed or continue:

Low rotor droop kickout at, for example only, 95 percent Nr and/or "kickout" at a rate of rotor droop of, for example only, 5 percent Nr/sec;

Training may not be entered with a FADEC fault;

All SCLs in FLY detent to enter training—training will kickout if a SCL is moved out of FLY when in training or in the training ARM mode;

Training mode "kickout" if actual FADEC fault incurred during training;

Actual WCA alerts remain ON for actual engine failure emergencies; and

TRAINING mode displayed on PFD.

These conditions shall either prevent entry into the training mode or shall cause the system to automatically exit training with reversion to actual values for Q and TGT displayed by the cockpit instrument display system 40.

If an aircrew attempts to enter training in a condition where the available power margin was equal to or less than the preset training power margin, the OEI/Bias training module 42 will generate a TRAINING UNAVAILABLE message.

Various example simulated training conditions are discussed below.

Figure 11A:
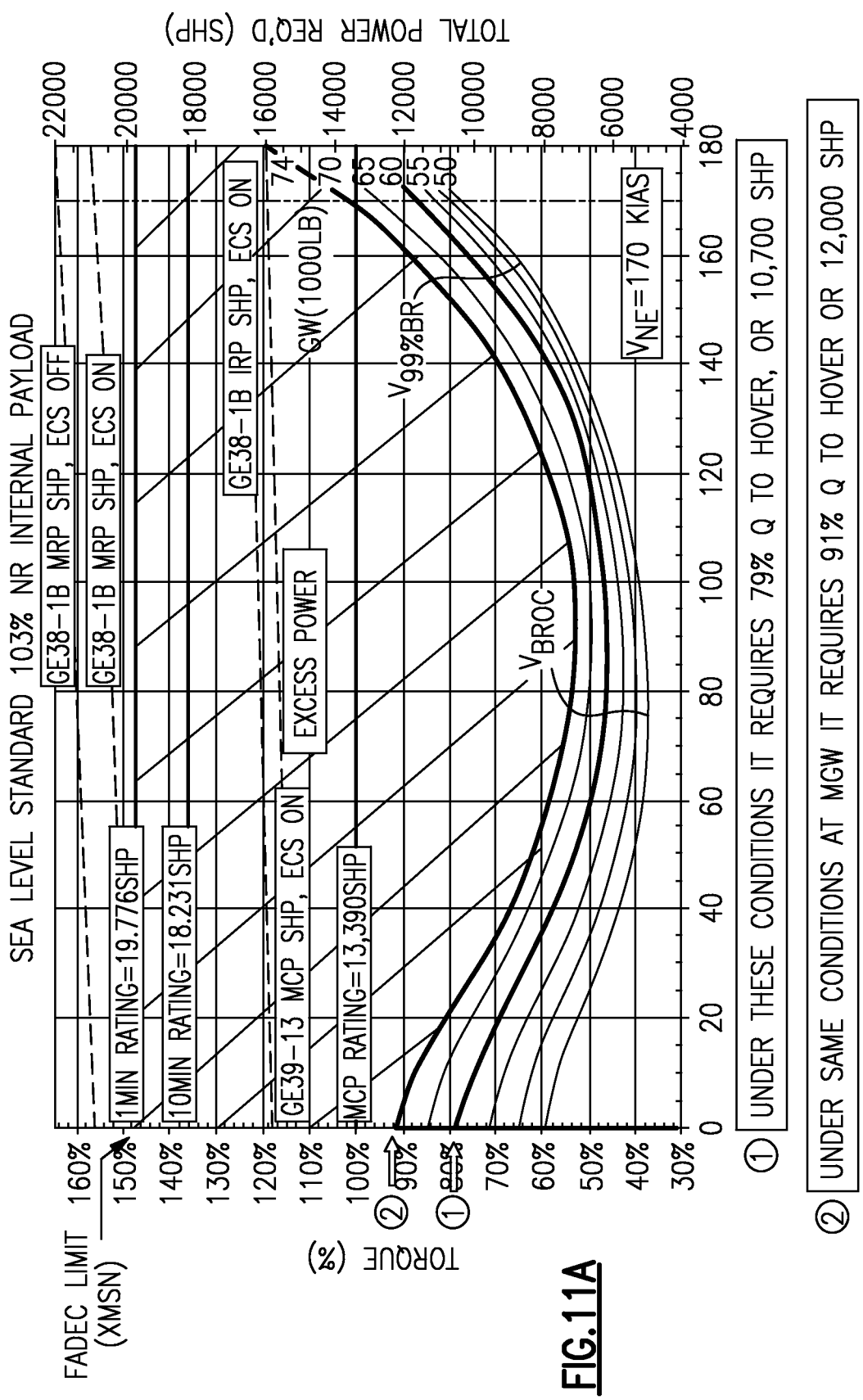
FIG. 11A illustrates a power required chart for a heavy lift aircraft at sea level standard day (SLSTD) conditions.

FIG. 11A illustrates a power required chart for a heavy lift aircraft at SLSD conditions with the aircraft operating at aircraft gross weight (AGW; aircrew and full fuel load) such that the aircraft requires 79 percent Q (10,700 SHP) to hover as illustrated by point #1. When the aircraft is operating at maximum gross weight (MGW; full internal pay load), the same aircraft operating in the same condition requires 91 percent Q (12,000 SHP) to hover. Although a significant access power margin exists under both conditions, the excess power margin (shaded region) is reduced at MGW.

Since the aircraft is actually loaded to AGW, an aircrew may wish to simulate operations at MGW which requires a shift in the excess power margin (cross-hatched region) from 79 percent Q to 91 percent Q. During such a simulation, the OEI/Bias training module 42 will adjust the multi-engine powerplant system 22 to reduce the excess power margin which shifts Q to 91 percent Q.

Figure 11B:
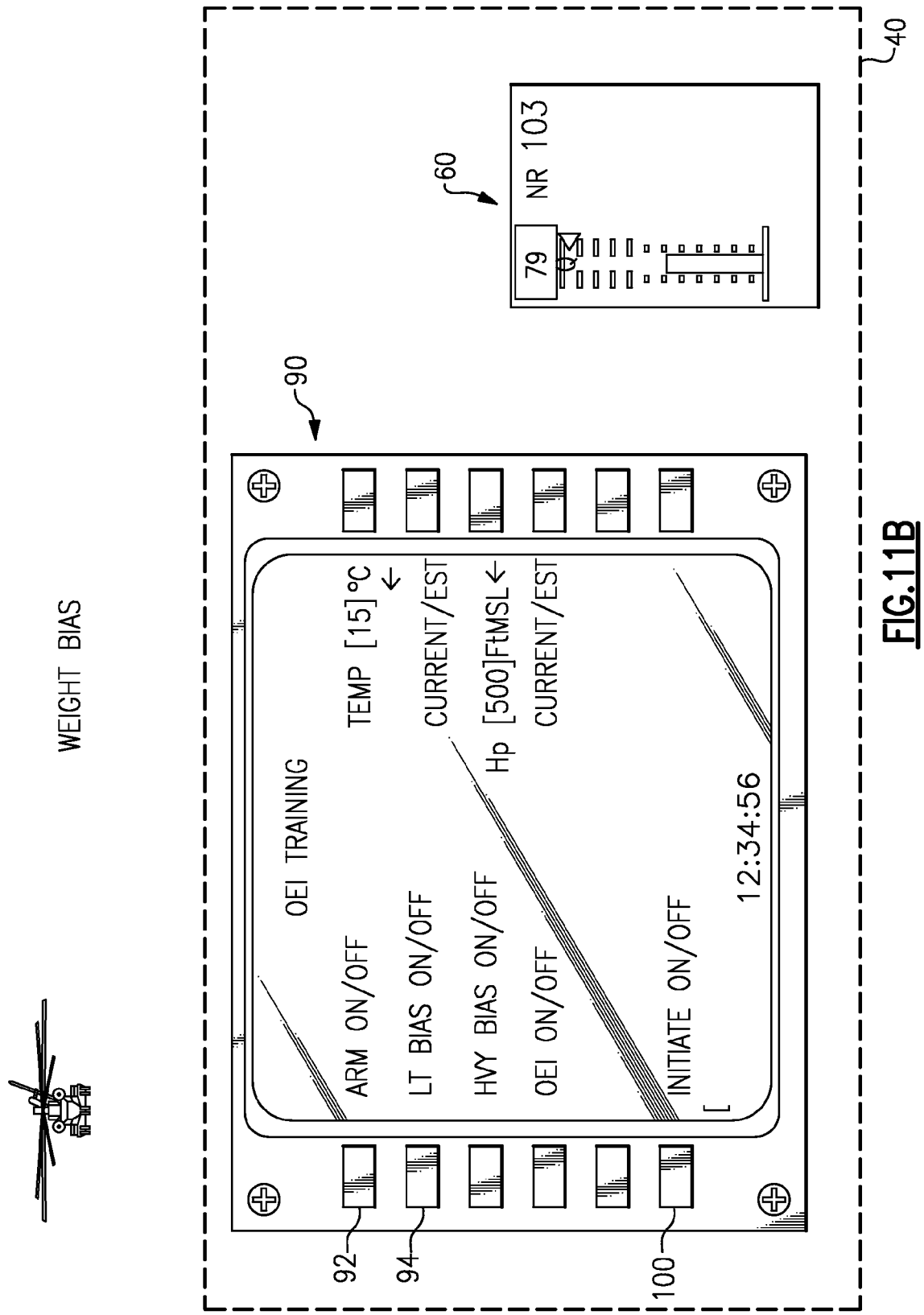
FIG. 11B is a schematic view of an OEI/BIAS display interface prior to an simulated LTBIAS condition and in accords with the power required chart of FIG. 11A.

Referring to FIG. 11B, the aircrew actions to simulate the light bias condition are initiated by the aircrew through the OEI/BIAS display 90. The aircrew first arms the system by selecting ARM 92 then selects LTBIAS 94. Training is then initiated by selection of INITIATE 100. As soon as INITIATE 100 is selected, all the engines of the multi-engine powerplant system 22 are horsepower limited to simulate the excess power margin which corresponds to 91 percent Q and the TORQUE DISPLAY 60 adjusts thereto (FIG. 11C).

Figure 11C:
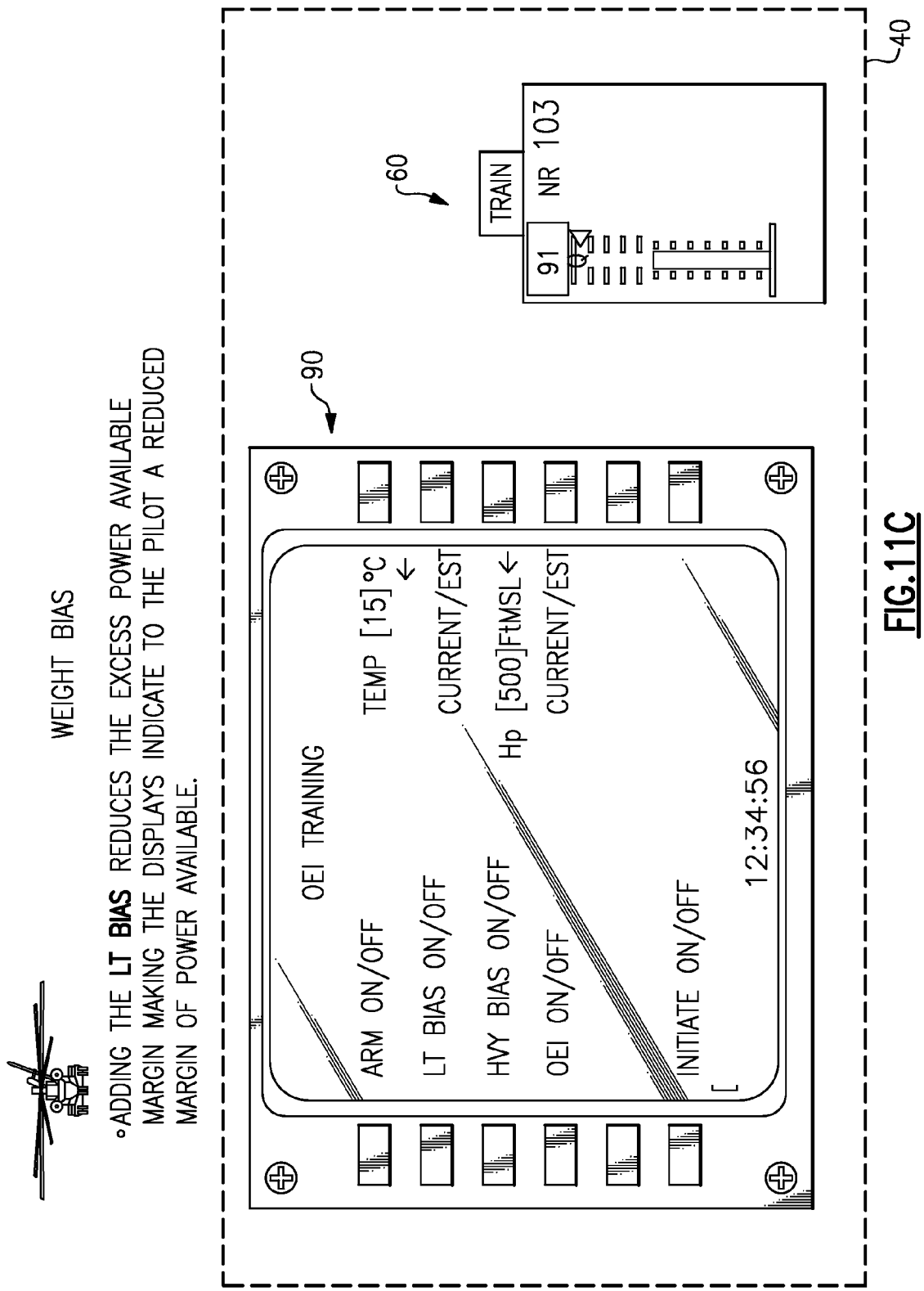
FIG. 11C is a schematic view of the OEI/BIAS display interface once the simulated LTBIAS condition of FIG. 11B has been initiated.

Referring to FIG. 11C, a TRAIN message is displayed on the TORQUE DISPLAY 60 to indicate to the aircrew that training is in progress. The OEI/Bias training module 42 continually checks to assure that all safety interlocks are satisfied in order to stay in the OEI Training condition (see FIG. 6B). Although the OEI/Bias training module 42 provides the reduced excess power margin, the MGB 20 is still level-loaded as all the engines are equivalently horsepower reduced to provide the desired training excess power margin (here represented by power available curve point #2).

Figure 12A:
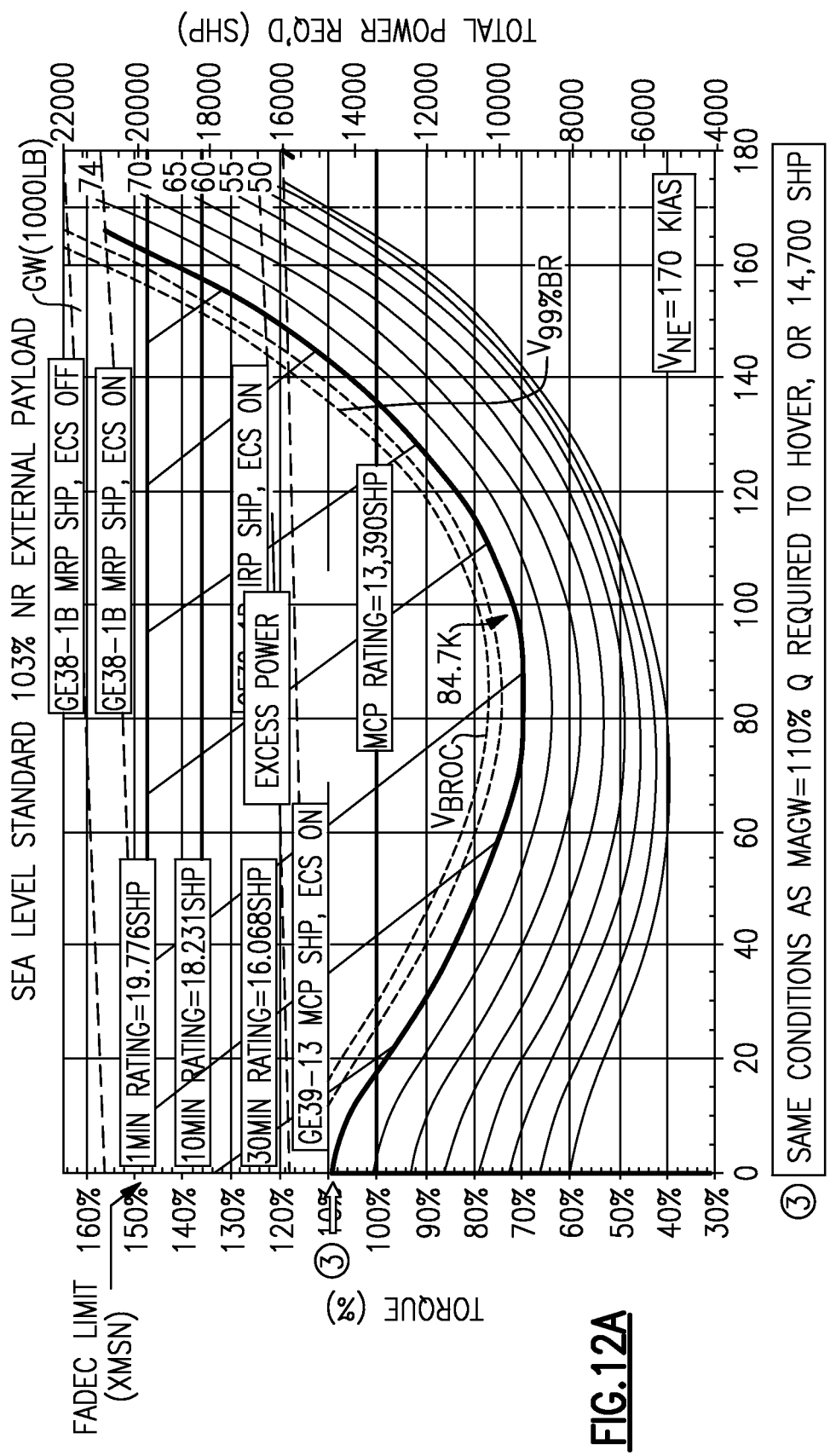
FIG. 12A illustrates a power required chart for a heavy lift aircraft at sea level standard day (SLSTD) conditions.
Figure 12B:
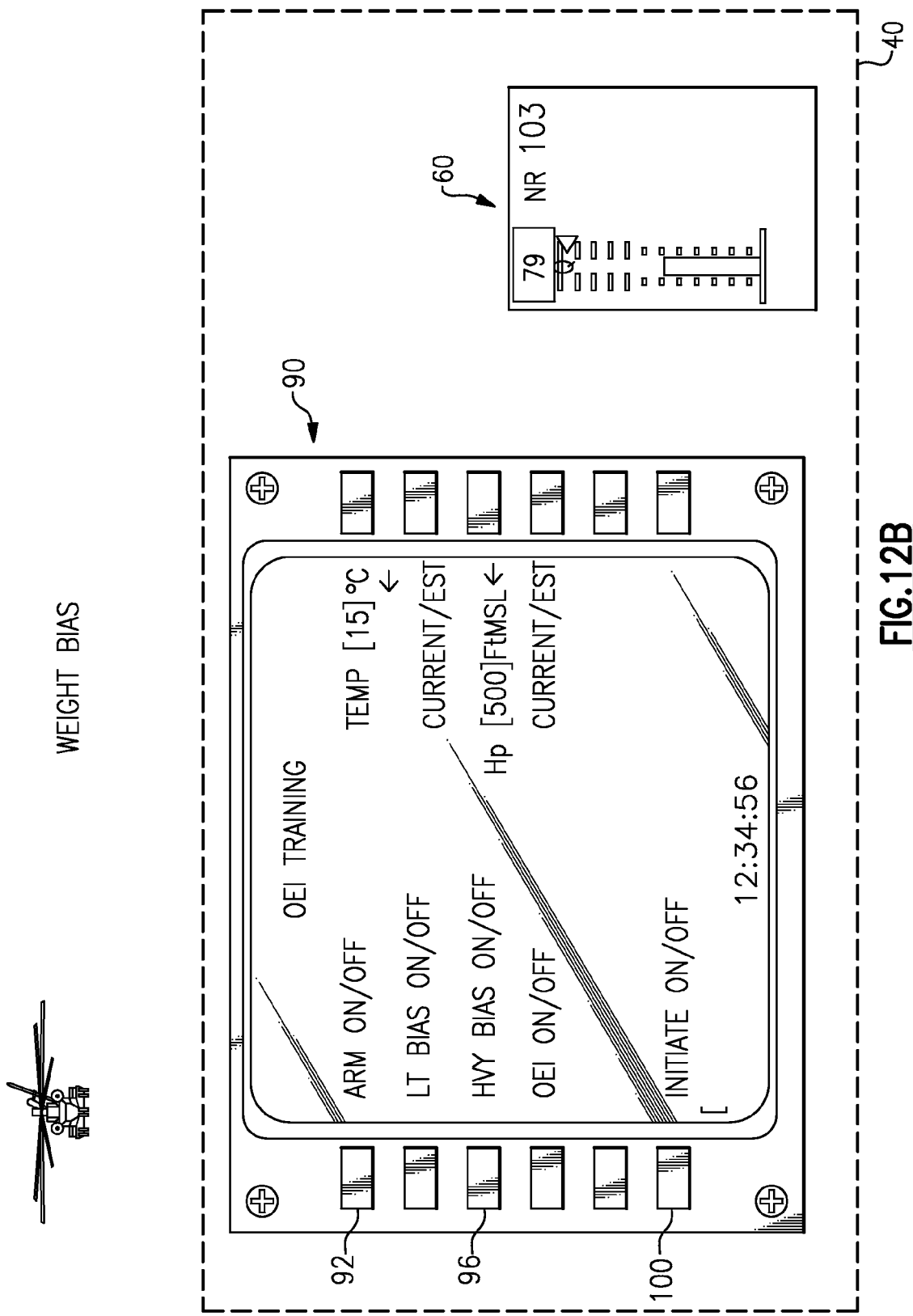
FIG. 12B is a schematic view of an OEI/BIAS display interface prior to an simulated HVYBIAS condition in accords with the with the power required chart of FIG. 12A.
Figure 12C:
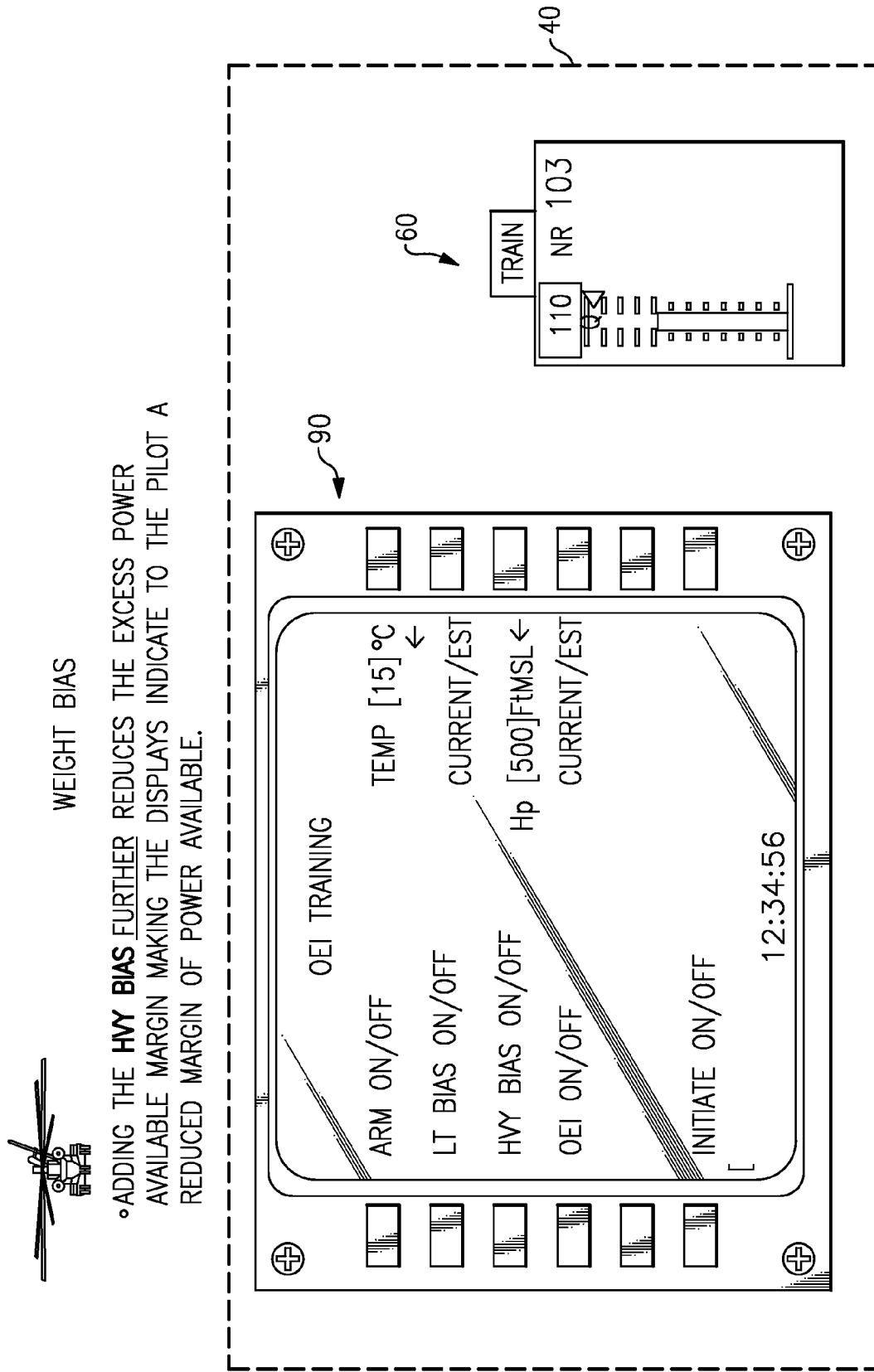
FIG. 12C is a schematic view of the OEI/BIAS display interface once the simulated HVYBIAS condition of FIG. 12B has been initiated.

Referring to FIG. 12A, the same aircraft operating in the same conditions but at maximum allowable gross weight (MAGW) such as an aircraft with an external payload, requires 110 percent Q to hover (point #3). As such, a further reduction in excess power margin in this HVYBIAS condition is provided by the OEI-BIAS Training module 42 to simulate this condition. As described generally above, the cockpit display system 40 will shift from current ambient conditions (FIG. 12B) to indicate to the pilot the reduced margin of power under the HVYBIAS Training condition (FIG. 12C). An aircraft at an AGW condition will therefore perform as an aircraft at a MAGW condition.

Figure 13A:
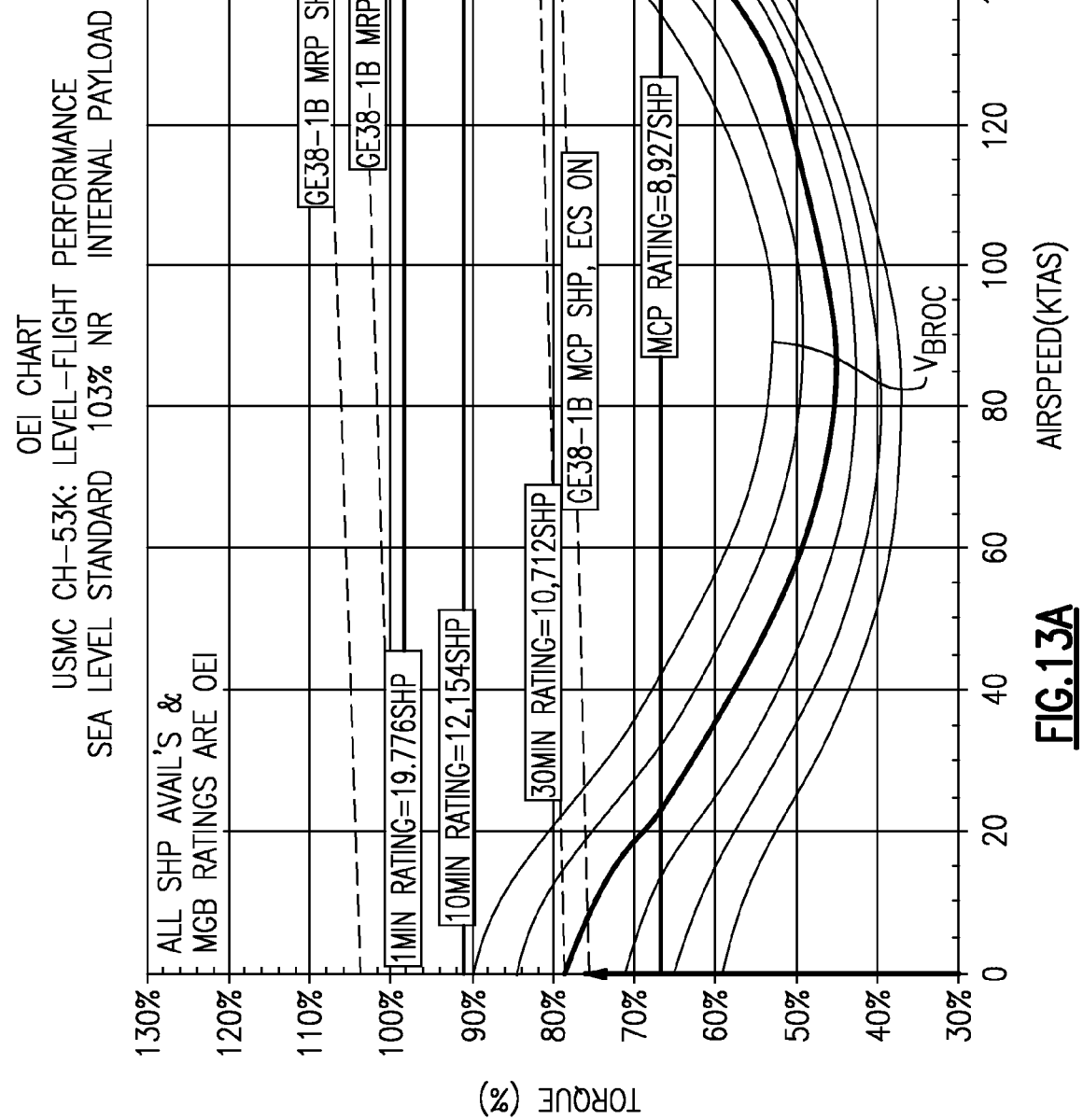
FIG. 13A illustrates an OEI power required chart for a heavy lift aircraft at sea level standard day (SLSTD) conditions.
Figure 13B:
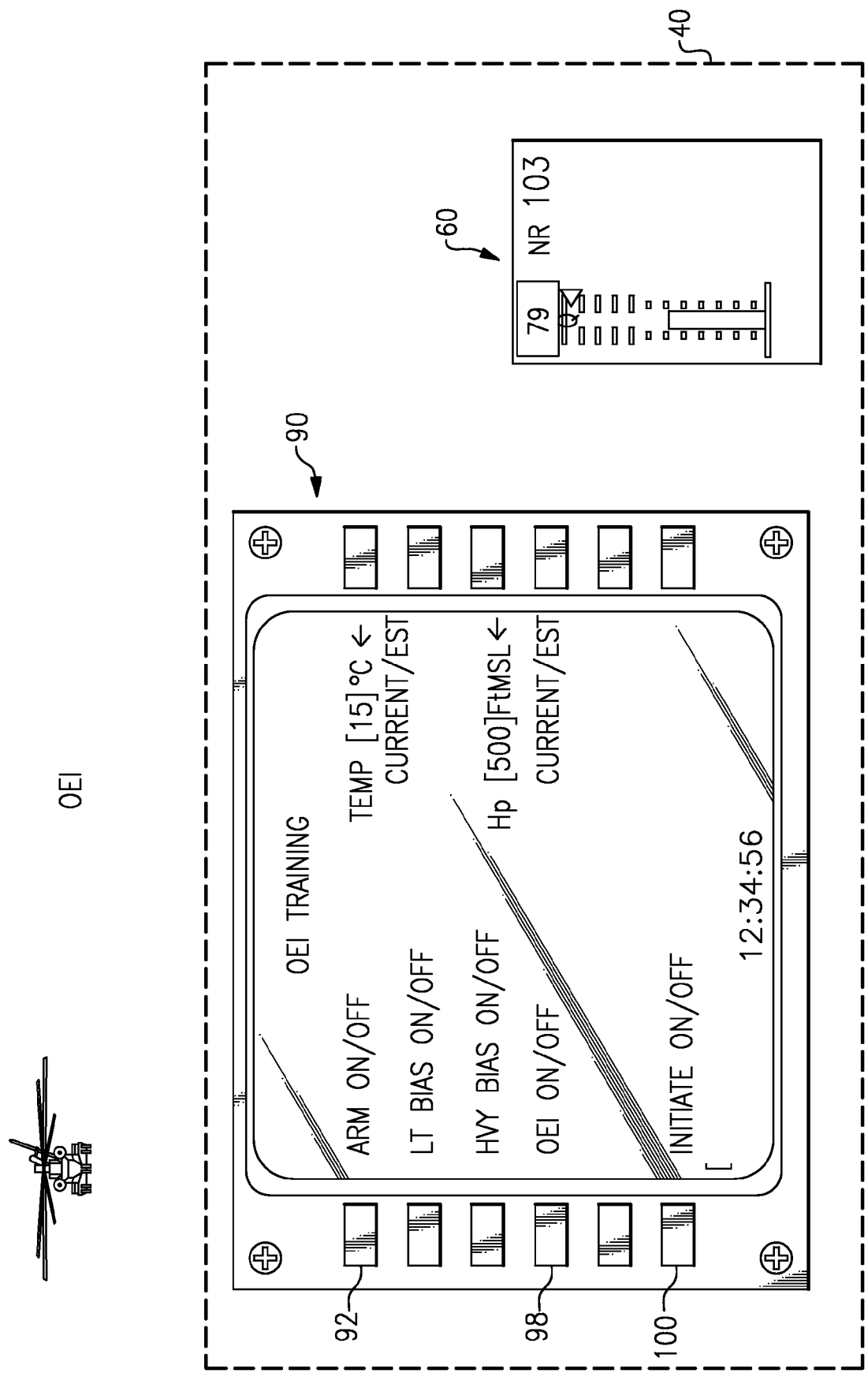
FIG. 13B is a schematic view of an OEI/BIAS display interface prior to an simulated OEI condition in accords with the with the power required chart of FIG. 13A.
Figure 13C:
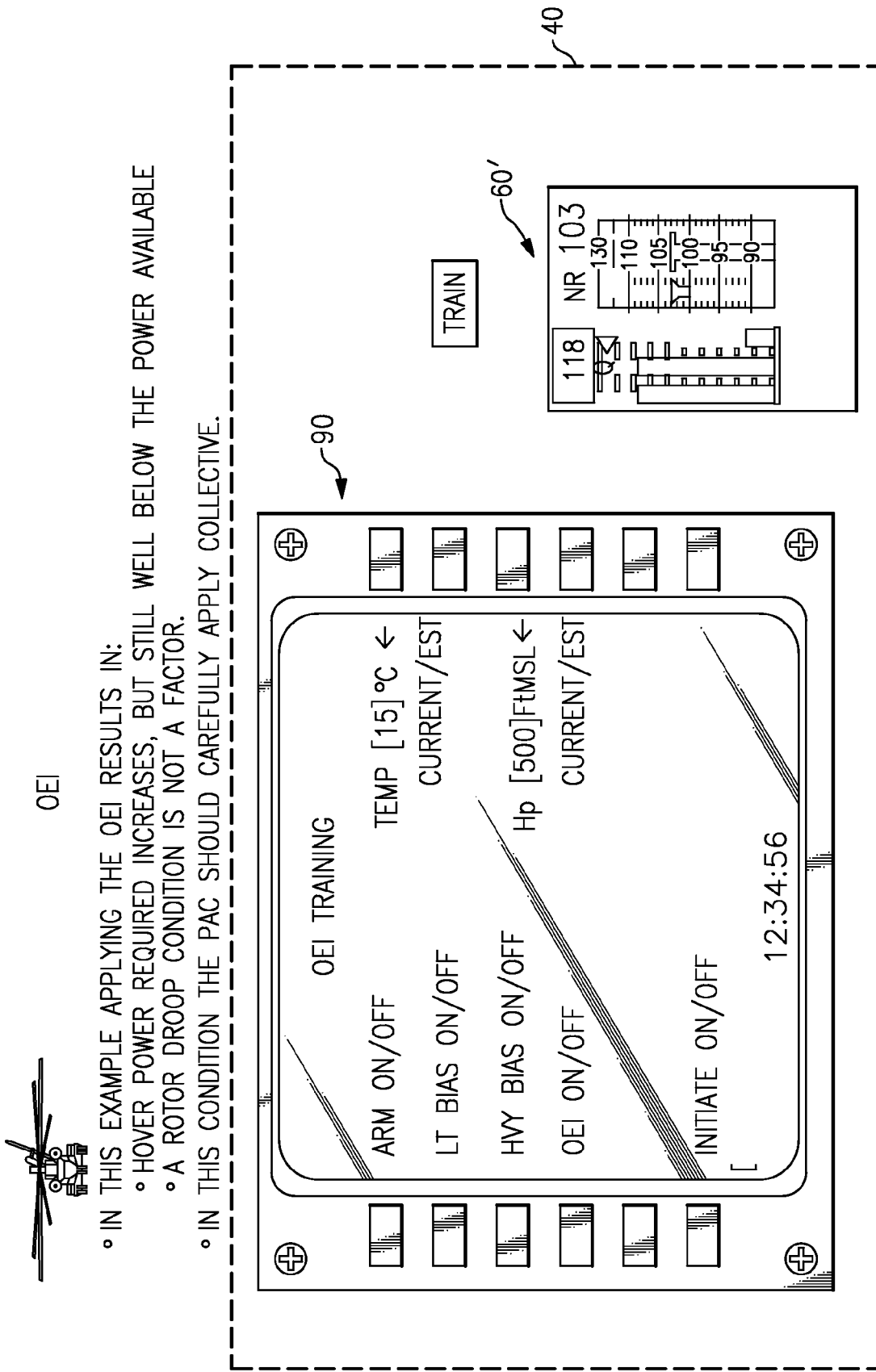
FIG. 13C is a schematic view of the OEI/BIAS display interface once the simulated OEI condition of FIG. 13B has been initiated.

Referring to FIG. 13A, a power available chart for an OEI condition is illustrated. Notably, even under an OEI condition, the aircraft still has a significant excess power margin. The aircrew actions to simulate the OEI condition is initiated by the aircrew through the OEI/BIAS display 90 (FIG. 13B). The aircrew first arms the system by selecting ARM 92. Once ARM 92 is selected, OEI 98 is selected. Training is then initiated by selection of INITIATE 100. The OEI/Bias training module 42 will then adjust the multi-engine powerplant system 22 to vary the excess power margin to simulate the OEI condition. During this simulated OEI condition the TORQUE DISPLAY 60 changes to the QUAD TAC DISPLAY 60' which illustrates that two engines are operating at 118 percent Q with the third engine essentially shut down (FIG. 13C). That is, to produce 10,700 SHP each engine needs to provide 79 percent Q. For an OIE condition, the two engines must still produce 10,700 SHP which requires a torque of 118 percent Q. [79 percent Torque (x) 3 Engines (/) 2 Engines=118 percent] Since the aircraft is still operating well below the power available, the main rotor still maintains the governed Nr and rotor droop does not occur.

Figure 14A:
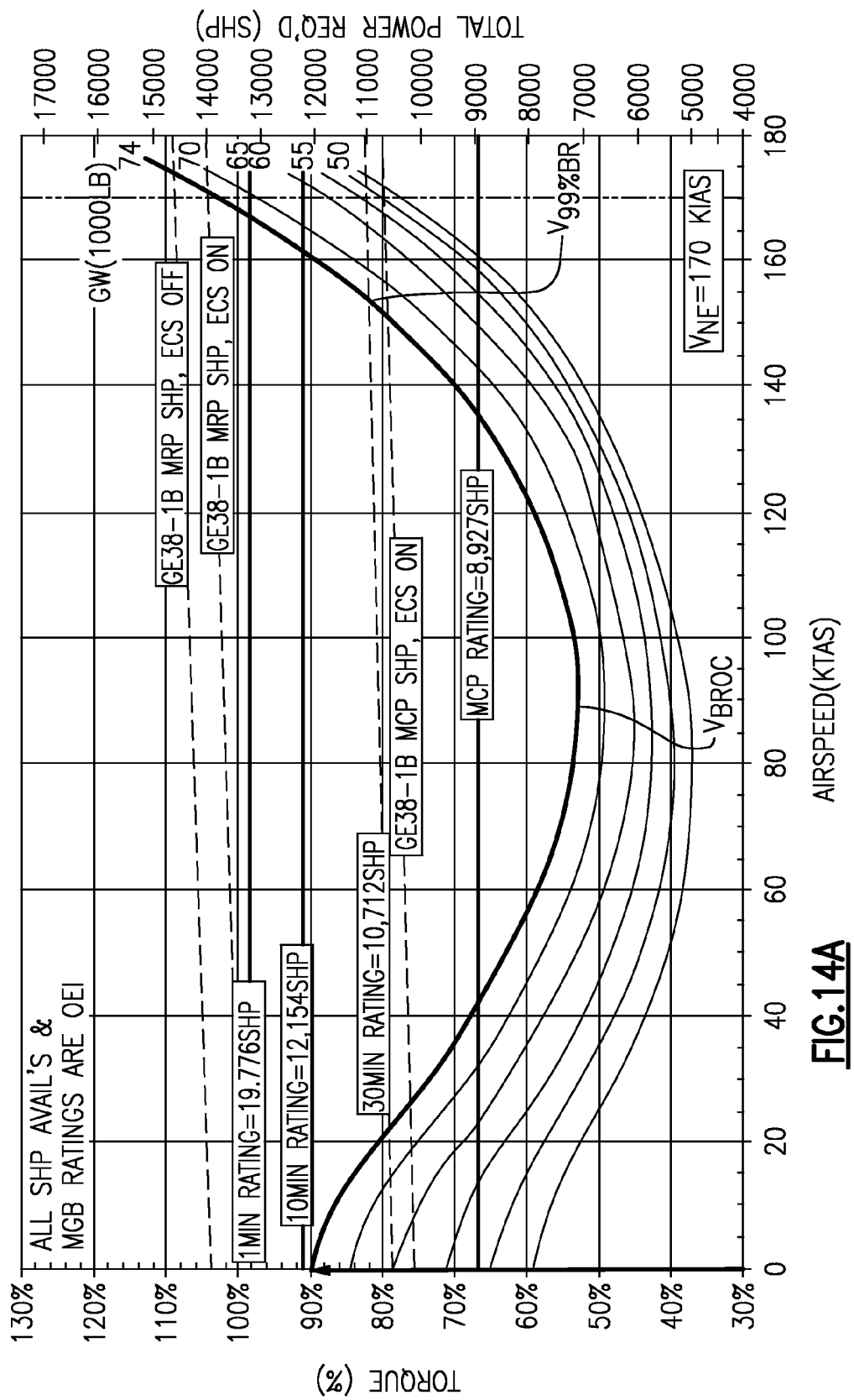
FIG. 14A illustrates an OEI power required chart for a heavy lift aircraft with a max internal load at sea level standard day (SLSTD) conditions.

Referring to FIG. 14A, a power available chart for an OEI condition with the aircraft at MGW, (full internal pay low) is illustrated. The aircrew actions to simulate the MGW and OEI condition are initiated through the OEI/BIAS display 90 (FIG. 14B).

Figure 14B:
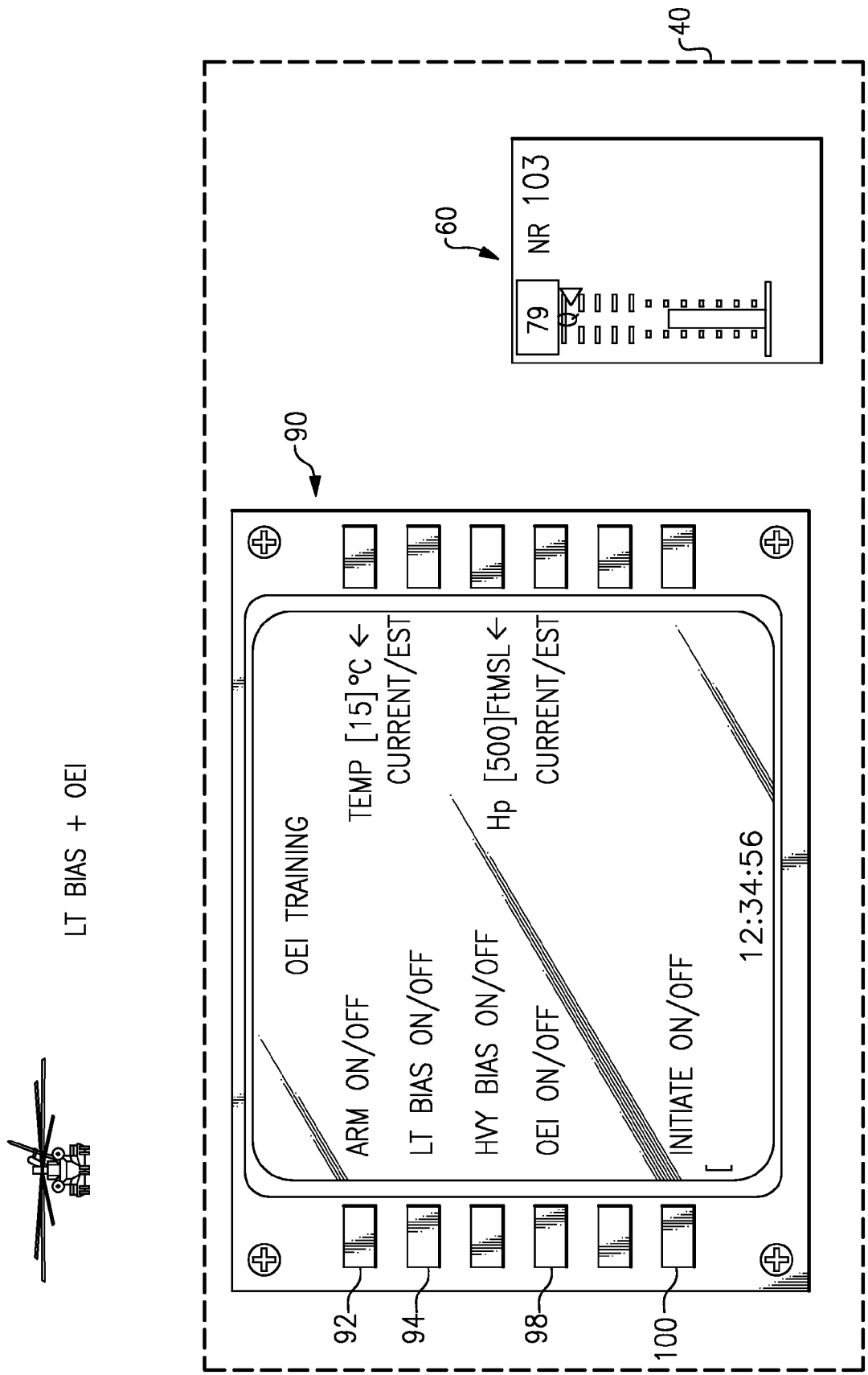
FIG. 14B is a schematic view of an OEI/BIAS display interface prior to an simulated OEI+LTBIAS condition in accords with the with the power required chart of FIG. 14A.
Figure 14C:
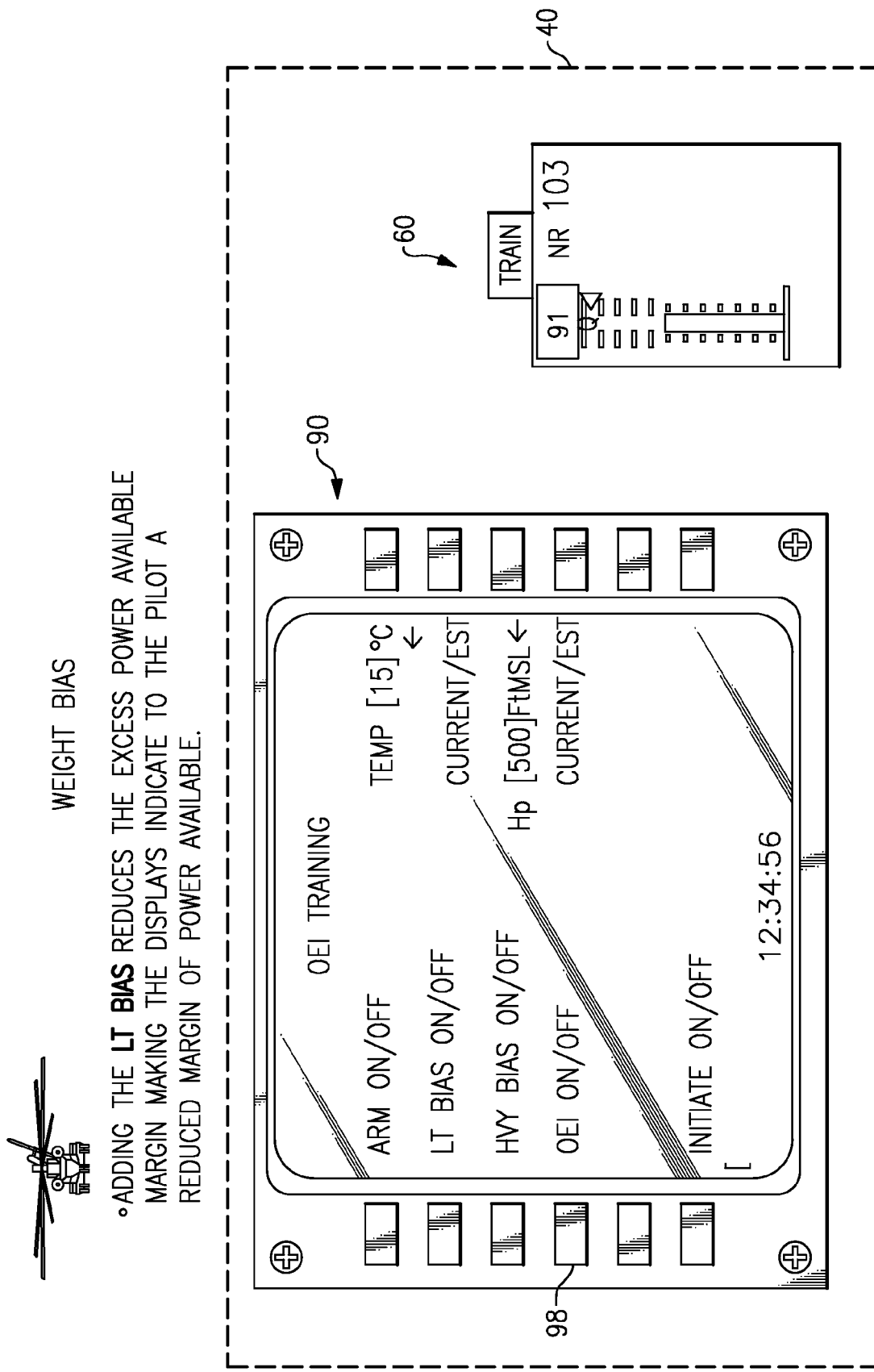
FIG. 14C is a schematic view of the OEI/BIAS display interface once the simulated LTBIAS condition of FIG. 14B has been initiated.
Figure 14D:
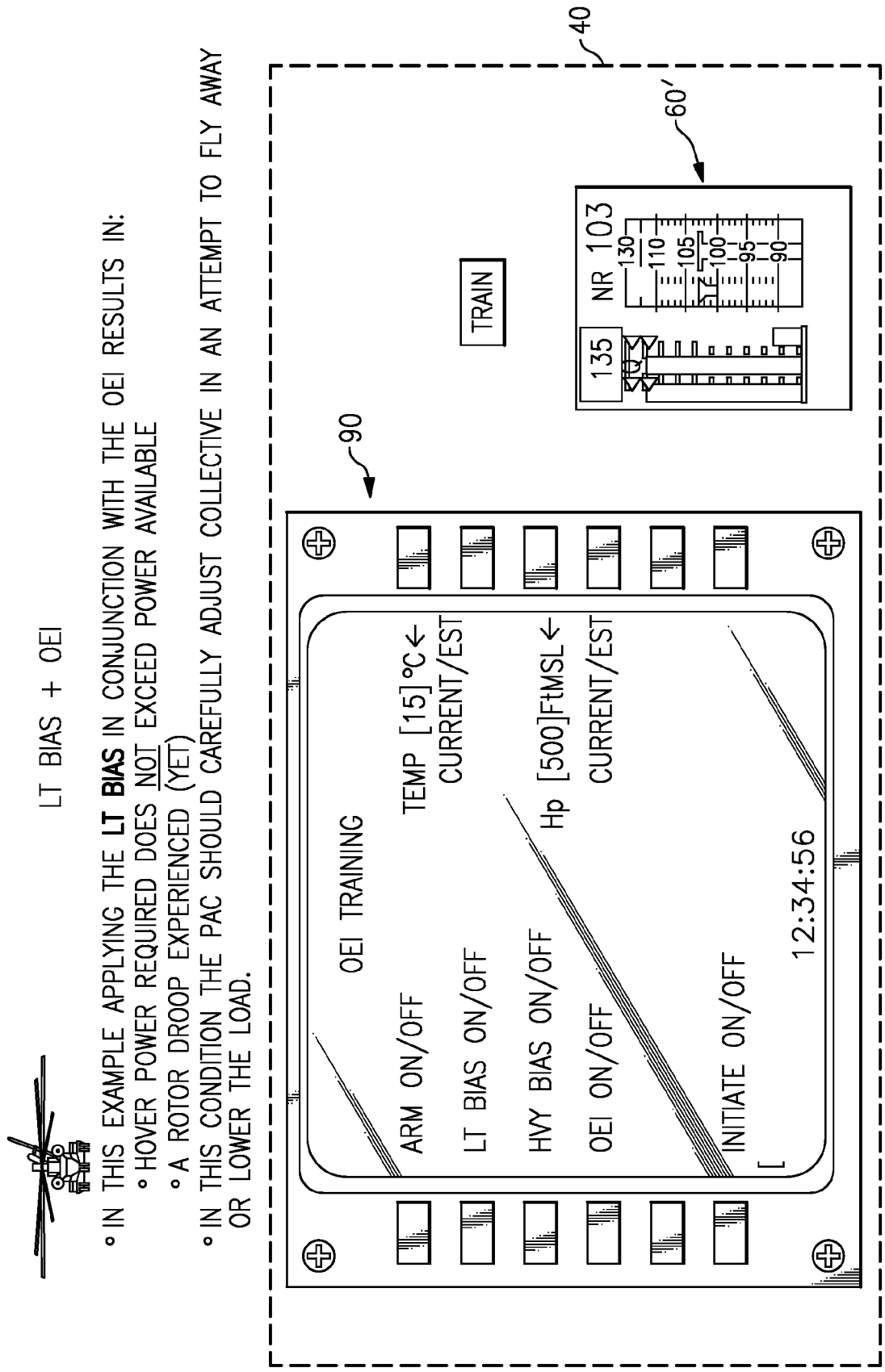
FIG. 14D is a schematic view of the OEI/BIAS display interface once the simulated LTBIAS condition of FIG. 14C has been overlaid with a simulated OEI condition.

Referring to FIG. 14B, the aircrew first arms the system by selecting ARM 92 then selecting LTBIAS 94. Training is then initiated by selection of INITIATE 100. The OEI/Bias training module 42 will then adjust the multi-engine powerplant system 22 to vary the excess power margin to simulate the LTBIAS condition (FIG. 14C). Under the LTBIAS (MGW) simulation, an instructor pilot may then select OEI 98 to overlay the OEI condition simulation. The OEI/Bias training module 42 will then adjust the multi-engine powerplant system 22 to further decrease the excess power margin to simulate the OEI condition (FIG. 14D). The cockpit instrument display system 40 thereby changes from the current MGW condition (FIG. 14C) to the LTBIAS+OEI training condition (FIG. 14D). Even though the aircraft is operating in a simulated OEI condition with a LTBIAS and hover power required increase, hover power required is still below power available. The bars 62 representing Q for the operating engines may be color coated, green for example, to further illustrate the engine operating condition.

In this simulated condition, the OEI condition in conjunction with the LTBIAS condition results in a Q increase to 135 percent. A Q condition of 135 percent is close to the first limit carat which requires moderated collective adjustments but does not result in a rotor droop condition. Also an increase in forward airspeed need not be immediate as hover power does not exceed power available—even though the aircraft must now operate close to the limit.

Figure 15A:
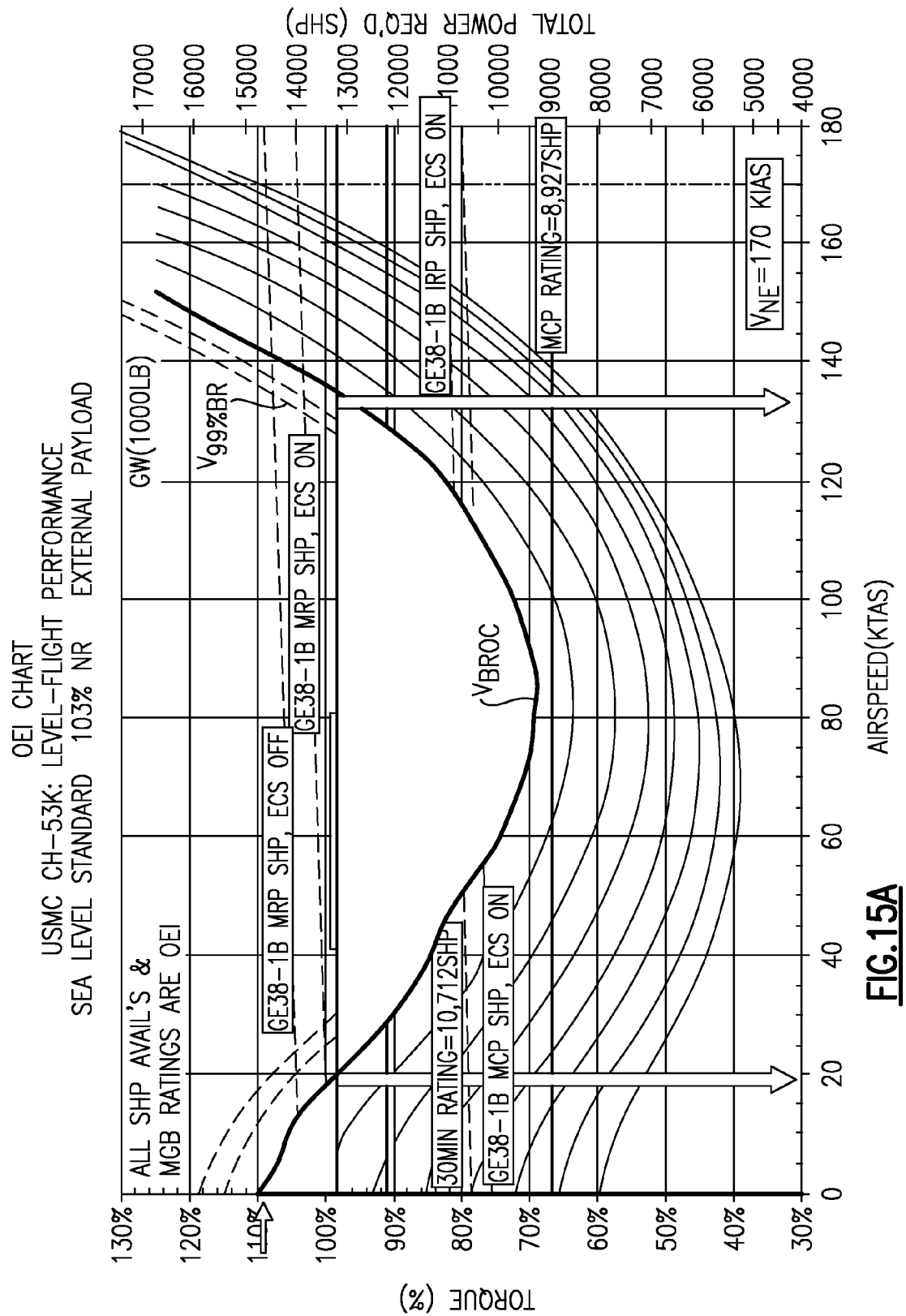
FIG. 15A illustrates an OEI power required chart for a heavy lift aircraft with a max internal load at sea level standard day (SLSTD) conditions.

Referring to FIG. 15A, a power available chart under an OEI condition at MAGW is illustrated. As shown, there is excess power available between 20 and 135 KTS air speed. However, a negative excess power available condition exists below 20 KTS such that the aircraft must either increase forward air speed or reduce aircraft weight such as by dropping the external load.

Figure 15B:
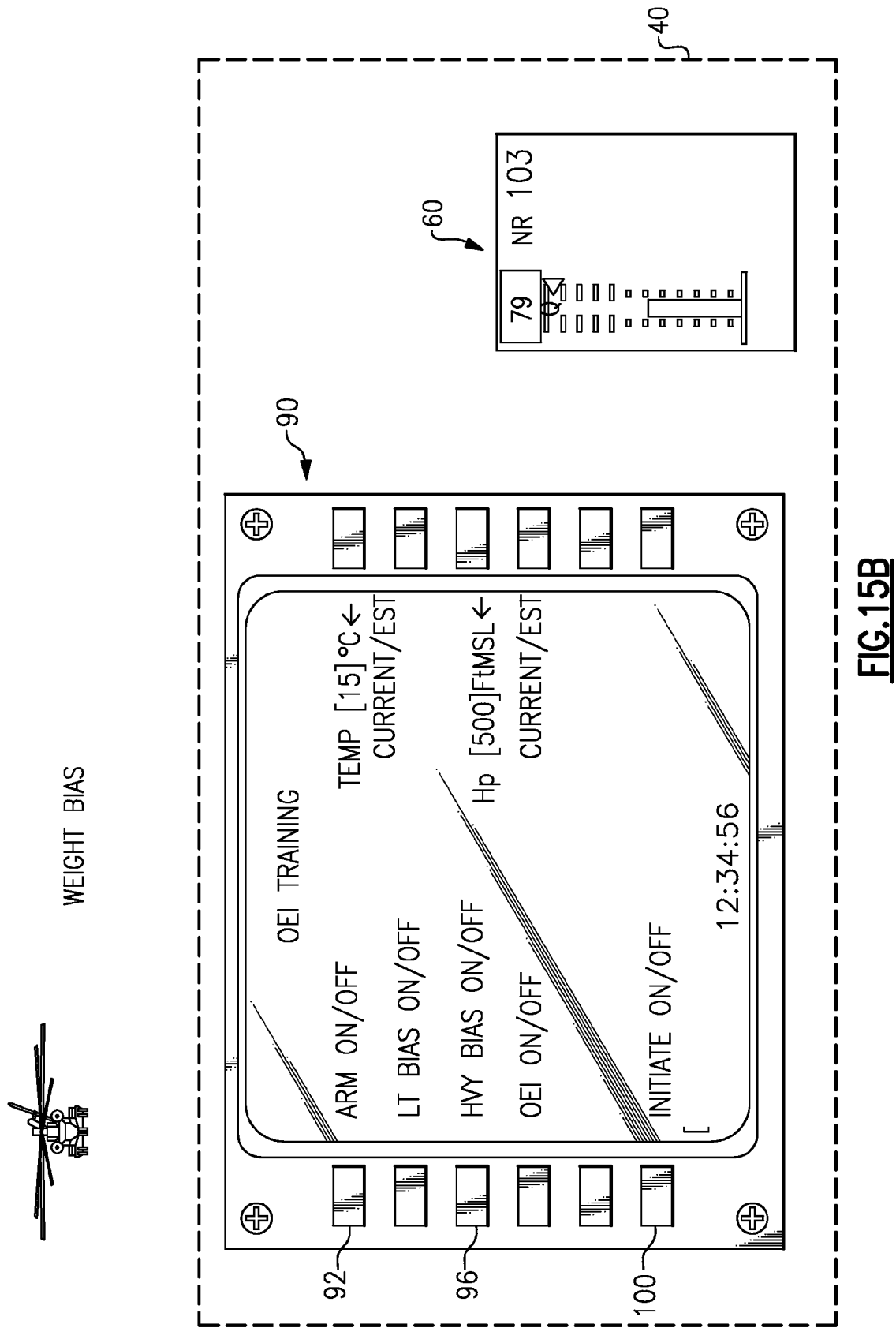
FIG. 15B is a schematic view of an OEI/BIAS display interface prior to an simulated OEI+HVYIAS condition in accords with the power required chart of FIG. 15A.
Figure 15C:
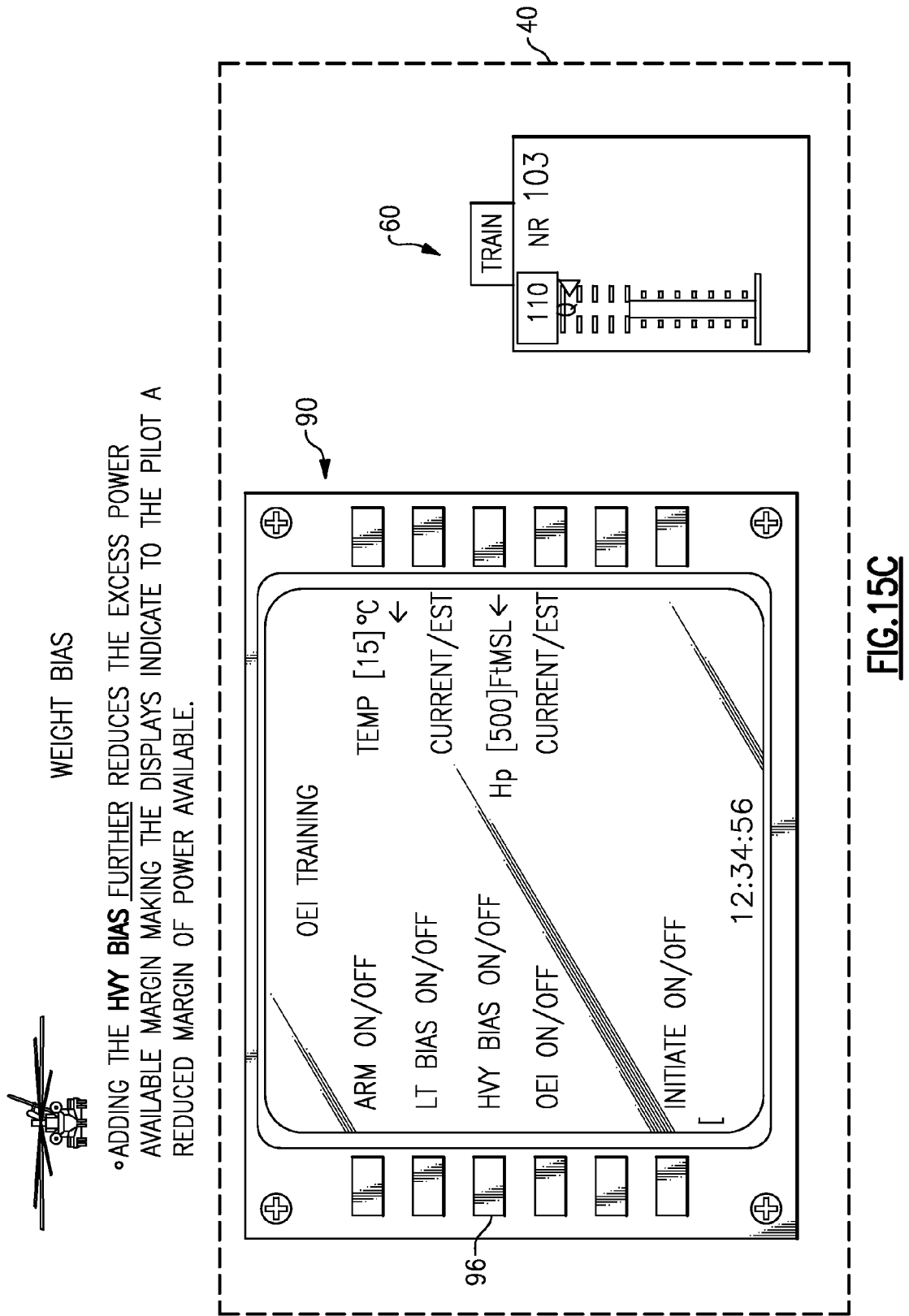
FIG. 15C is a schematic view of the OEI/BIAS display interface once the simulated HVYBIAS condition of FIG. 15B has been initiated.

The aircrew actions required to simulate the MAGW and OEI condition are generally as discussed above, but the instructor pilot selects HVYBIAS 96 instead of LTBIAS 94—notably both cannot be selected (FIG. 15B). The cockpit instrument display system 40 thereby changes from a current condition (FIG. 15B) to a HVYBIAS training condition (FIG. 15C).

Under the MAGW (HVYBIAS) simulation, an instructor pilot may then select OEI 98 to overlay the OEI condition simulation. The OEI/Bias training module 42 will then adjust the multi-engine powerplant system 22 to decrease the excess power margin to simulate the HVYBIAS+OEI condition so that the aircrew will receive feed back as to an actual rotor droop condition. The cockpit instrument display system 40 thereby changes from the HVYBIAS current condition (FIG. 15C) to the HVYBIAS+OEI training condition (FIG. 15D).

Figure 15D:
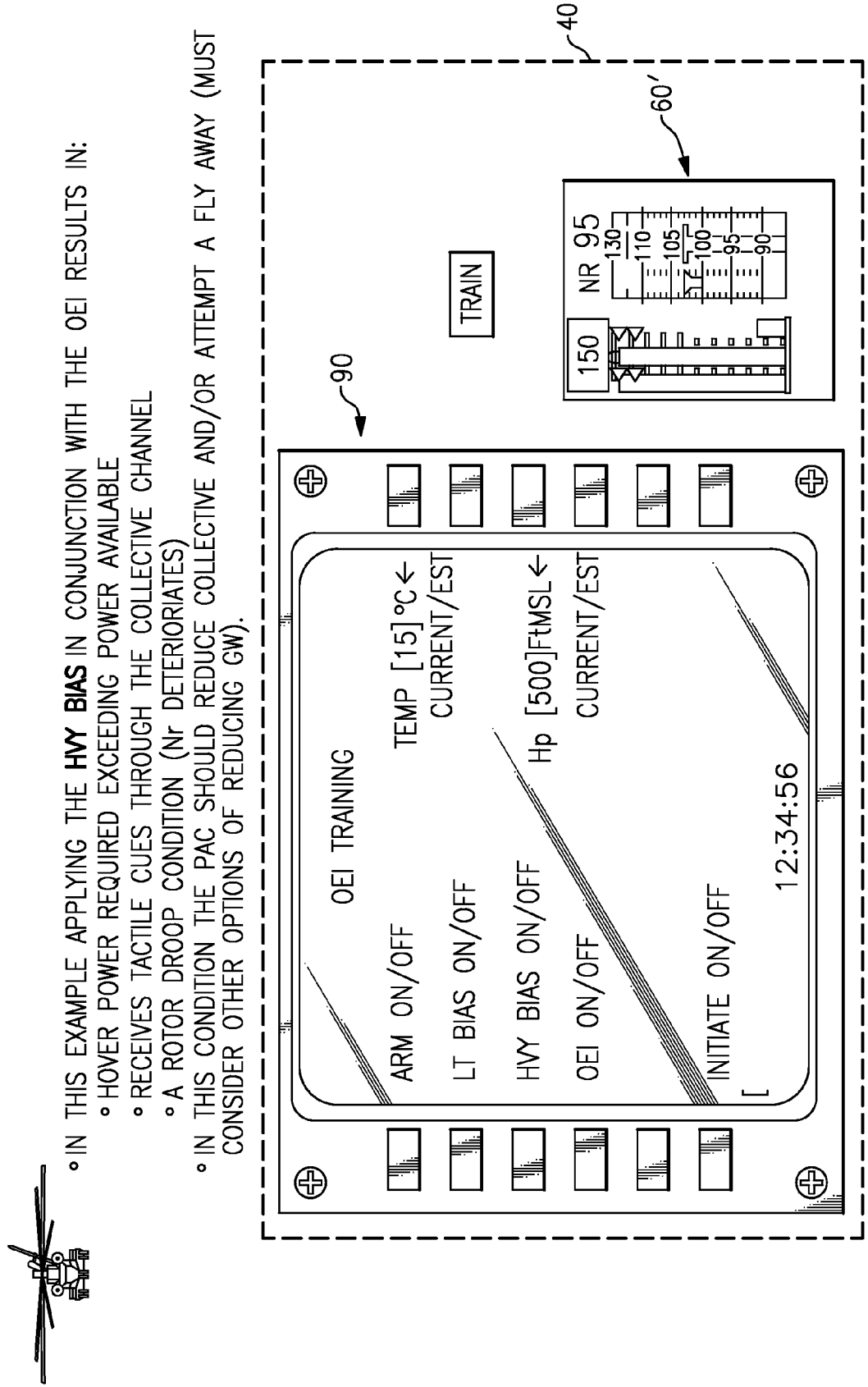
FIG. 15D is a schematic view of the OEI/BIAS display interface once the simulated HVYBIAS condition of FIG. 15C has been overlaid with a simulated OEI condition.

Referring to FIG. 15D, a rotor droop condition has occurred and the two operation engines are now simulated as operating above the second limit (SLI). The bars 62' representing Q on the QUAD TAC DISPLAY 60' for the operating engines may be color-coded, red for example, to further illustrate the engine operating condition. Furthermore, a one minute turbine gas temperature TGT counter is active to provide the aircrew a safe operating remaining time under this condition.

Under the simulated MAGW and OEI condition, hover power required exceeds power available and a rotor droop condition will occur. The aircrew is thereby challenged to correct this condition within this time limit.

The aircrew will receive an eyes-out reference to this condition through the tactile collective cue system 32 (FIG. 10). The aircrew will receive and experience a force increase at the FLI point (detent) which will then increase in force toward the SLI point at which the collective stick will shake (FIG. 10). Since the aircraft is operating above the SLI, the tactile collective cue system will introduce the stick shaker as the collective stick 38 is above the SLI point (FIG. 10; FIG. 6) and the aircrew will receive an eyes-out reference to this exceedance condition.

Figure 15E:
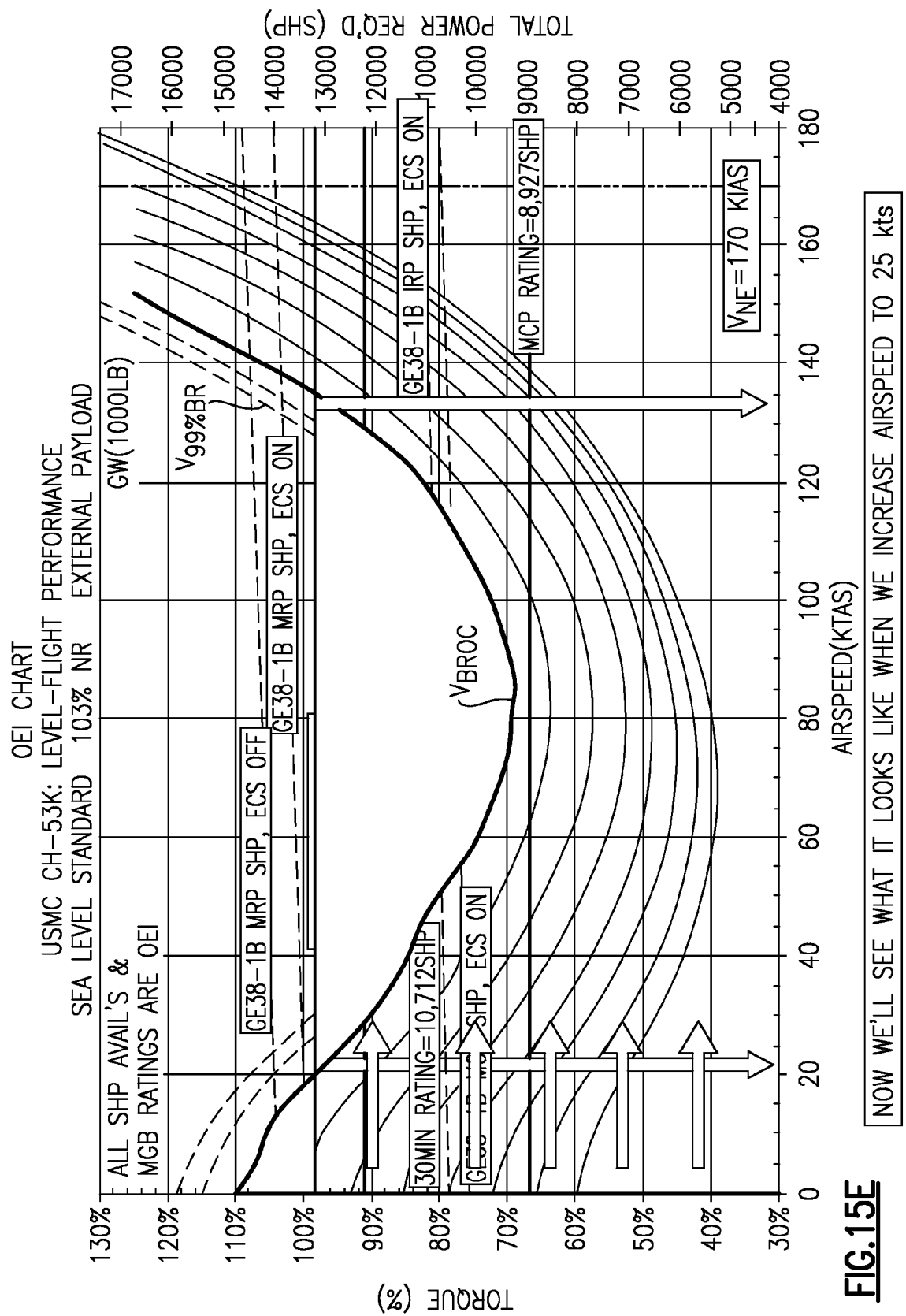
FIG. 15E illustrates an OEI power required chart for a heavy lift aircraft with a max internal load at sea level standard day (SLSTD) conditions illustrating that the negative excess power margin condition will lessen when the aircraft accelerates from hover to 25 KTS airspeed.
Figure 15F:
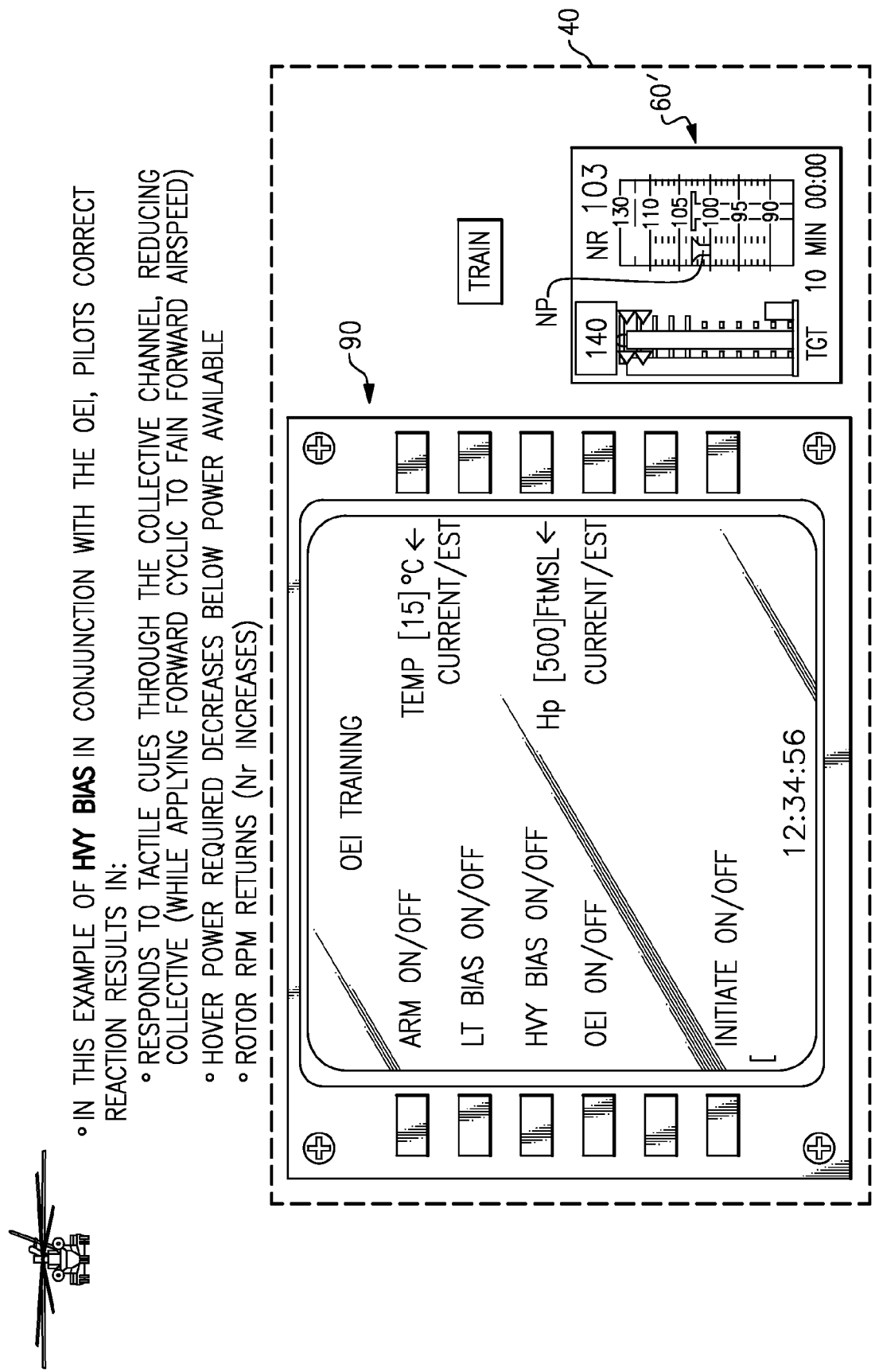
FIG. 15F is a schematic view of the OEI/BIAS display interface once the aircraft accelerates from hover to 25 KTS airspeed.

In one response to the rotor droop condition, the aircrew can reduce collective while applying forward cyclic to gain forward airspeed. As the aircrew corrects the condition by the reduction of the collective while applying forward cyclic, the aircraft will gain forward airspeed and enter the "bucket" shaded area (see FIG. 15E) such that power required decreases below power available and rotor speed Nr will return toward normal governed Nr (such as 103 percent) (FIG. 15F). The bars 62 representing Q on the QUAD TAC DISPLAY 60' for the operating engines may be color coated, which would typically be color coded yellow for example, to further illustrate the engine operating condition is below the FLI point but above the SLI point.

As the aircraft is now operating below the FLI point and above the SLI point, the tactile collective cue system still provides an eyes-out reference to this condition which avoids the necessity of scanning cockpit instruments in the cockpit (FIG. 10). Above the SLI, the aircrew receives an increase force response in the collective stick 38 the SLI point at which a detent is essentially felt by the aircrew.

In another response to the rotor droop condition, the aircrew can elect to simulate "pickling" or releasing the external load. By pickling the load, the OEI/Bias training module 42 will immediately shift from the MAGW and OEI condition to a MGW and OEI condition. That is, when pickling the external load, power required immediately changes to be below power available and rotor speed Nr will return to normal governed Nr (such as 103 percent) (See FIG. 14D). The simulated pickling of the external load provides a training condition which conditions an aircrew response to decide when such an external load pickle should be initiated rather than, for example, attempting to reduce collective while applying forward cyclic to gain forward airspeed as discussed above.

The OEI/Bias training module 42 also prevents a load increase after an OEI condition is selected. That is, should an aircraft experience an OEI condition, the aircrew would not attempt to pick up an external load.

Figure 16A:
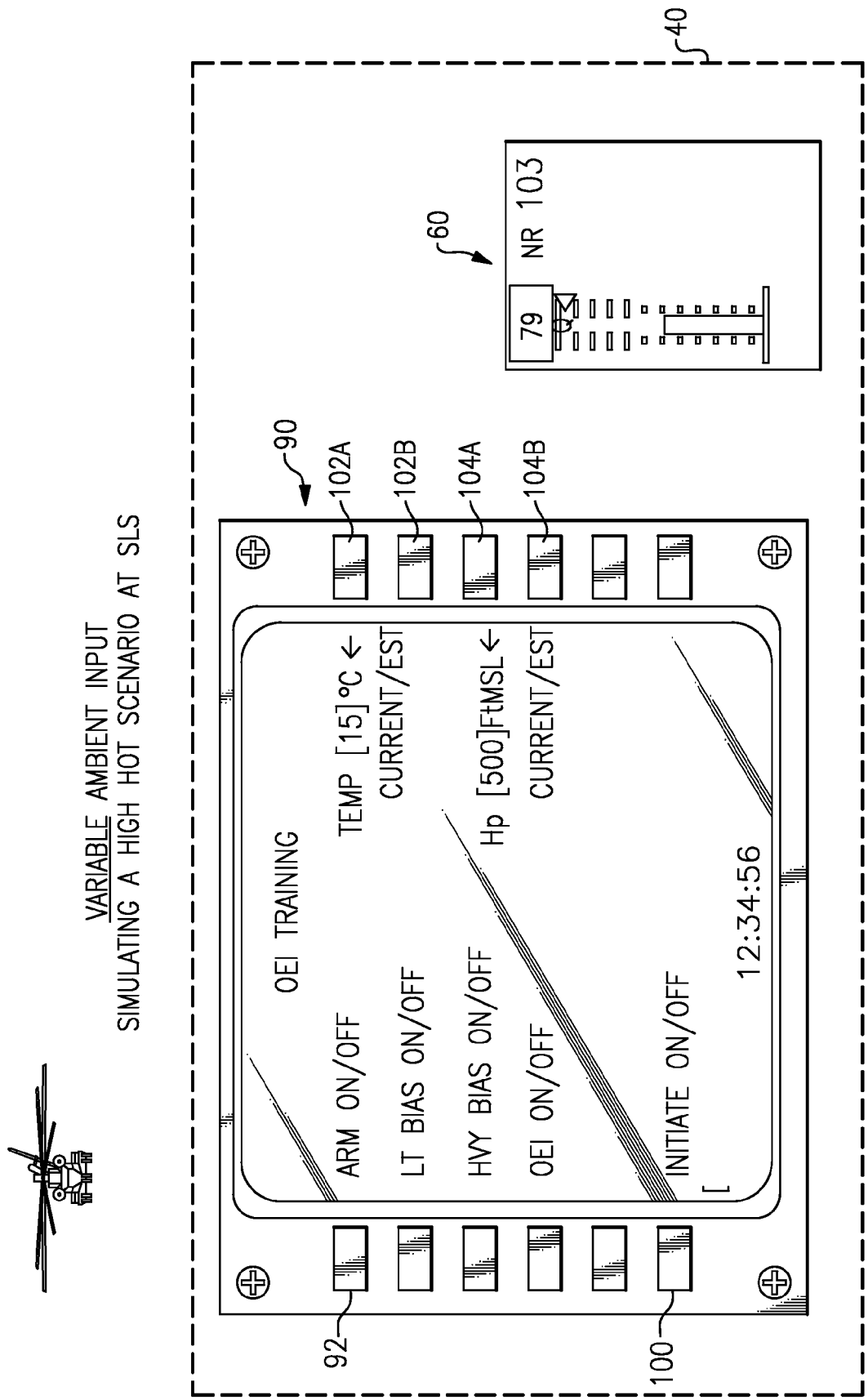
FIG. 16A is a schematic view of an OEI/BIAS display interface prior to an simulated environmental condition.

Referring to FIG. 16A, the aircrew may also simulate various aircraft environment conditions such that the OEI/Bias training module 42 will then variably bias the excess power margin to simulate the desired environmental conditions. That is, the OEI/Bias training module 42 utilizes the power available and power required lookup tables (WAT curves) for the simulated conditions (Calculate OEI training limits/characteristic (WAT curves); FIG. 6) rather than the current actual conditions that the aircraft is currently operating in and simulates aircraft operations 102A, 102B, 104A, 104B at the selected environmental conditions. Again, as this is a simulated BIAS condition, the aircraft is at AGW and all engines are in fact operating throughout the simulation. That is, this is not a rotor droop condition such that only the cockpit instrument display system 40 is adjusted.

Figure 16B:
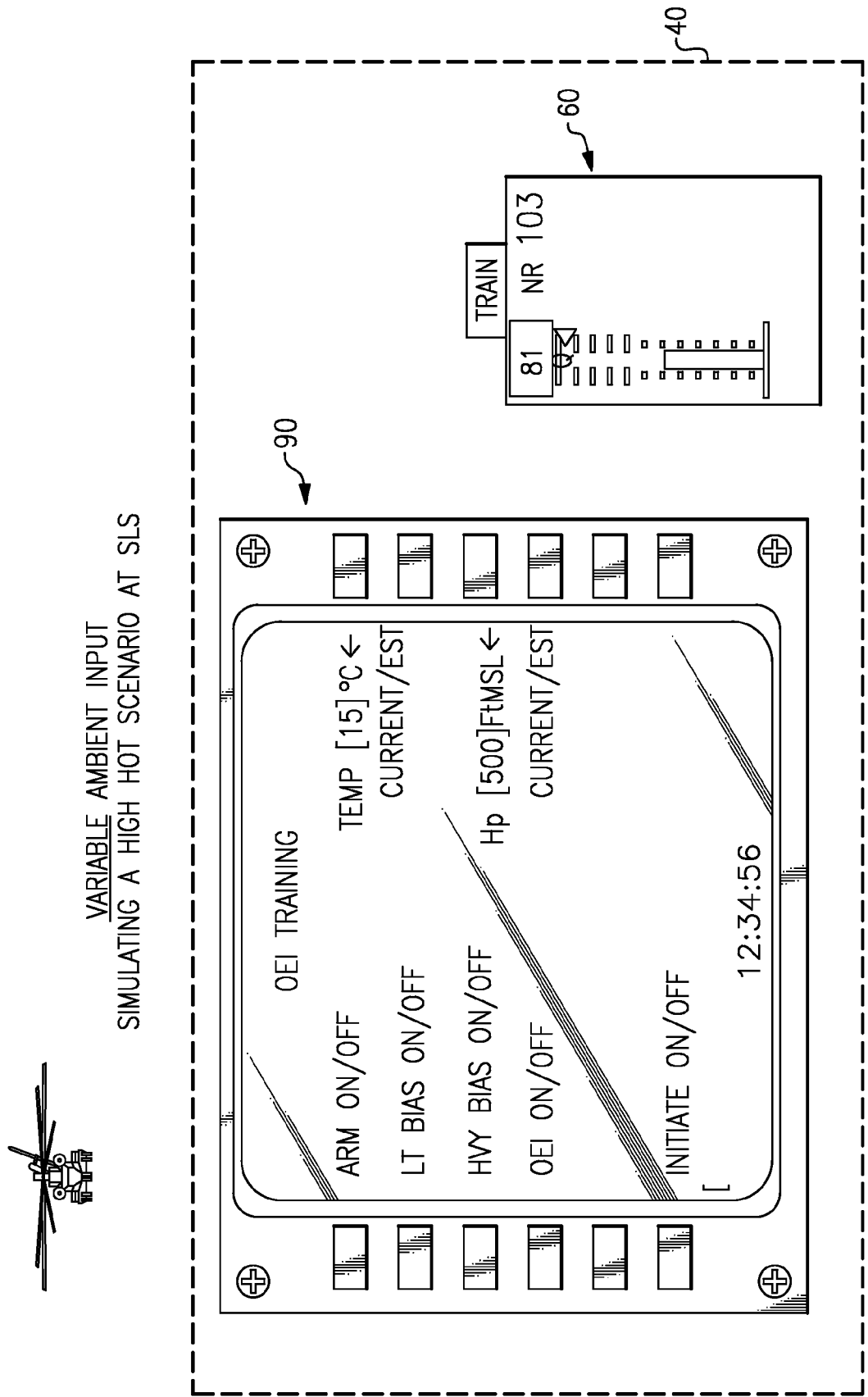
FIG. 16B is a schematic view of the OEI/BIAS display interface once the simulated environmental condition of FIG. 16A has been initiated.

In this environment condition example, the aircraft is currently operating in an environment of 15 degrees Celsius and 500 feet sea level (FTMSL). The aircrew actions to simulate the desired environmental conditions the through the OEI/BIAS display 90 begin by first arming the OEI/BIAS system by selecting ARM 92. The aircrew then enters the desired temperature 102B and height 104B through an input the device of the cockpit instrument display system 40. In this example, a 35 degree Celsius and 3000 foot MSL condition is entered such that when initiate 100 is selected, the OEI/Bias training module 42 will accordingly adjust the displays and excess power available (FIG. 16B). An aircrew may thereby simulate high and hot conditions when operating in current ambient conditions. That is, irrespective of the current ambient conditions, the OEI/Bias training module 42 will simulate ambient conditions the aircrew plans to operate in, e.g. an aircraft in California can simulate operations in Afghanistan.

Furthermore, various combinations of BIAS and OEI simulations may then be overlaid on the simulated ambient environmental conditions so long as the selections are within the aircraft flight envelope. Various combinations of BIAS and OEI simulations may also result in a rotor droop condition in which the OEI/Bias training module 42 will then adjust the multi-engine powerplant system 22 to decrease the excess power margin to simulate the condition so that the aircrew will receive feed back as to an actual rotor droop condition.

Should a selection or a combination of selections be attempted which are outside the aircraft flight envelope, the OEI/Bias training module 42 will reject that condition or combination of conditions and provide a TRAINING UNAVAILABLE message.

The OEI/Bias training module 42 is based on real time ambient conditions, actual performance charts, and realistic gross weights. No aircrew manual reference of WAT curves are required such that aircrews may readily accomplish training through a wide range of ambient conditions and gross weights so as to reduce the man-in-the-loop application of the WAT curves. Realistic feedback from the displays, automated ambient selections, power selection and tactile cues through the controls simulate actual air vehicle response analogous to actual conditions.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method for conducting flight procedures training in a rotary-wing aircraft with a multi-engine powerplant comprising:
    continuously determining an instantaneous available power margin of the multi-engine powerplant system in real time;
    continuously determining a variable bias relative to the instantaneous available power margin;
    limiting a torque of each engine of the multi-engine powerplant system relative to the variable bias to simulate a reduced power available for a flight condition; and
    displaying symbology indicative of the simulated reduced power available flight condition.

2. A method as recited in claim 1, wherein said determining an available power margin further comprises:
    utilizing current ambient conditions and current aircraft weight to determine the available power margin.

3. A method as recited in claim 1, further comprising:
    equally reducing a power from each engine of the multi-engine powerplant to simulate the reduced power available flight condition in response to the reduced power available flight condition such that said reduced power available flight condition will result in a rotor droop condition.

4. A method as recited in claim 1, wherein limiting the torque of each engine maintains level-loading of a main rotor gearbox.

5. A method as recited in claim 1, further comprising:
    selecting the reduced power available flight condition based at least in part on a predefined aircraft weight.

6. A method as recited in claim 1, further comprising:
    selecting the reduced power available flight condition based at least in part on a predefined maximum internal aircraft weight condition.

7. A method as recited in claim 1, further comprising:
    selecting the reduced power available flight condition based at least in part on a predefined maximum external aircraft weight condition.

8. A method as recited in claim 1, further comprising:
    selecting the reduced power available flight condition based at least in part on one engine inoperable (OEI) condition.

9. A method as recited in claim 1, further comprising:
    associating the reduced power available flight condition in relation to a one engine inoperable (OEI) condition at a predefined aircraft weight.

10. A method as recited in claim 9, wherein said displaying symbology step further comprises:
    randomly selecting one engine for simulated failure display symbology; and displaying symbology indicative of the simulated failure of the selected engine.

11. A method as recited in claim 10, wherein said displaying symbology step further comprises:
displaying a timer representing engine operation in response to the simulated operation when operating above a predetermined operational time limit.

12. A method as recited in claim 1, wherein said displaying symbology step further comprises:
displaying symbology indicative that a training state is active.

13. A method as recited in claim 1, wherein said displaying symbology step further comprises:
modifying symbology indicating turbine gas temperature (TGT) and engine torque of all engines of the multi-engine powerplant to indicate increases in TGT and engine torque to simulate an increase in aircraft weight.

14. A method as recited in claim 1, wherein said displaying symbology step further comprises:
modifying symbology indicating turbine gas temperature (TGT) and engine torque of all engines of the multi-engine powerplant to indicate decreases in the TGT and engine torque to simulate decrease in aircraft weight.

15. A method as recited in claim 1, wherein said displaying symbology step further comprises:
displaying a symbology indicative of a First Limit Indicator (FLI) adjacent symbology indicative of a rotor torque.

16. A module for conducting flight procedures training in a rotary-wing aircraft, comprising:
a multi-engine powerplant system;
a cockpit instrument display system; and
an OEI/BIAS training system in communication with said multi-engine powerplant system and said cockpit instrument display system, said OEI/BIAS training system operable to continuously determine a variable bias relative to a continuously updated available power margin by limiting a torque of each engine of said multi-engine powerplant system to simulate a reduced power available flight condition, wherein the continuously updated available power margin is continuously updated in real time.

17. The module as recited in claim 16, wherein said multi-engine powerplant system includes three engines.

18. The module as recited in claim 17, wherein said training system operates to apply a symmetrical load limit on each of the three engines of the multi-engine powerplant system.

19. The module as recited in claim 16, wherein said cockpit instrument display system is operable to display a TORQUE DISPLAY which expands to a QUAD TAC DISPLAY in response to a rotor droop condition.

20. The module as recited in claim 19, wherein said QUAD TAC DISPLAY is operable to display a torque bar for each engine in response to the rotor droop condition.

21. The module as recited in claim 16, wherein said cockpit instrument display system comprises an OEI/BIAS display operable to displays a multiple of selectable weight biases associated with a respective multiple of reduced power available flight conditions.

22. A method as recited in claim 1, further comprising:
simulating releasing an external load; and
changing the torque of each engine of the multi-engine powerplant system to simulate the reduced power available flight condition related to an aircraft weight condition without the external load.

23. A method as recited in claim 1, further comprising:
continuously calculating the available power margin from an actual aircraft weight and a desired training weight.

24. A method as recited in claim 23, wherein the desired training weight is a maximum internal aircraft weight condition.

25. A method as recited in claim 23, wherein the desired training weight is a maximum external aircraft weight condition.

26. A method as recited in claim 23, wherein the desired training weight is a one engine inoperable (OEI) condition.

* * * * *